(12) United States Patent
Barnes et al.

(10) Patent No.: US 6,922,177 B2
(45) Date of Patent: Jul. 26, 2005

(54) IMPULSE RADAR ANTENNA ARRAY AND METHOD

(75) Inventors: Mark A. Barnes, Madison, AL (US); Charles G. Gilbert, Huntsville, AL (US); Herbert U. Fluhler, Madison, AL (US); Hans G. Schantz, Huntsville, AL (US); Soumya K. Nag, Huntsville, AL (US); David M. Dickson, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 294 days.

(21) Appl. No.: 10/083,689

(22) Filed: Feb. 26, 2002

(65) Prior Publication Data

US 2002/0190915 A1 Dec. 19, 2002

Related U.S. Application Data

(63) Continuation of application No. 09/998,480, filed on Nov. 30, 2001, now Pat. No. 6,667,724.
(60) Provisional application No. 60/271,499, filed on Feb. 26, 2001.

(51) Int. Cl.[7] .............................................. H01Q 21/00
(52) U.S. Cl. ...................... 343/893; 343/844
(58) Field of Search ................... 343/893, 700 MS, 343/778, 770, 745

(56) References Cited

U.S. PATENT DOCUMENTS

| | | | | | |
|---|---|---|---|---|---|
| 3,618,104 | A | * | 11/1971 | Behr | 343/745 |
| 5,255,004 | A | * | 10/1993 | Berkowitz et al. | 343/853 |
| 5,323,169 | A | * | 6/1994 | Koslover | 343/786 |
| 6,175,333 | B1 | * | 1/2001 | Smith et al. | 343/700 MS |
| 6,621,469 | B2 | * | 9/2003 | Judd et al. | 343/853 |

* cited by examiner

*Primary Examiner*—James Vannucci
(74) *Attorney, Agent, or Firm*—Law Office of Donald D. Mondul

(57) ABSTRACT

An antenna array comprising a ground plane and a plurality of elements mounted thereon, said elements being capable of emitting and receiving ultra wideband emissions. Elements are arrayed on the ground plane in two parallel rows, a transmitting row, and a receiving row, such that a given element in the receiving row is aligned in at least one direction with a corresponding element in the transmitting row. Additionally, the elements are configured on the ground plane to elicit a symmetrical product response in the azimuthal plane, and to produce horizontally polarized signals. An alternative embodiment places the elements with unique inter-element spacing within the rows. An embodiment comprises a fence structure between rows. A method for use comprises the step of transmitting a signal via an element in the transmitting row and receiving said signal through an element in the receiving row, not aligned with the transmitting element.

42 Claims, 21 Drawing Sheets

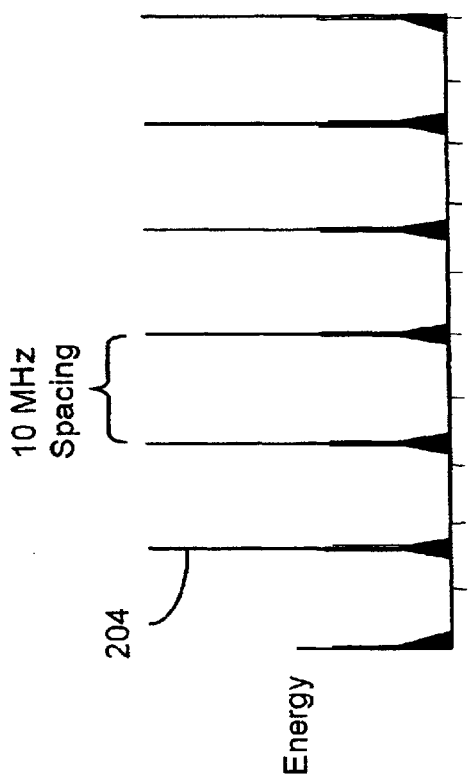
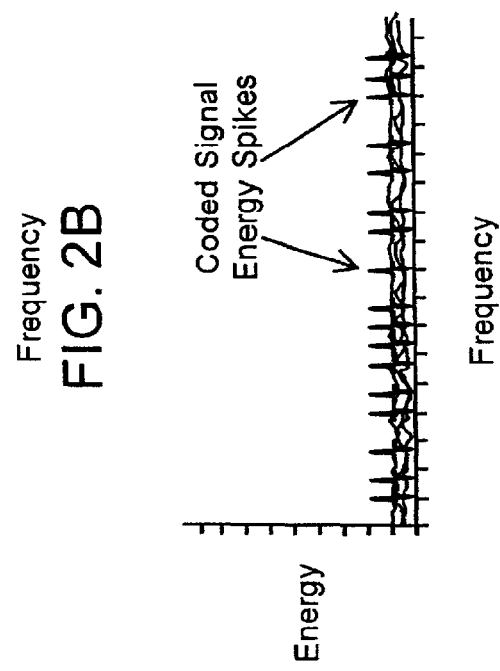
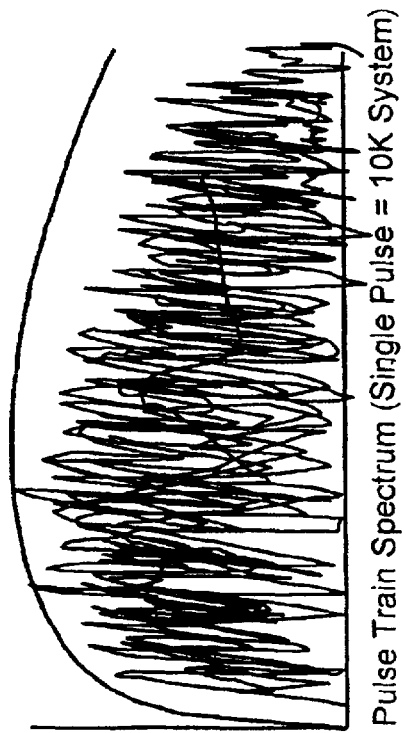
FIG. 2A
FIG. 2B
FIG. 2C
FIG. 2D

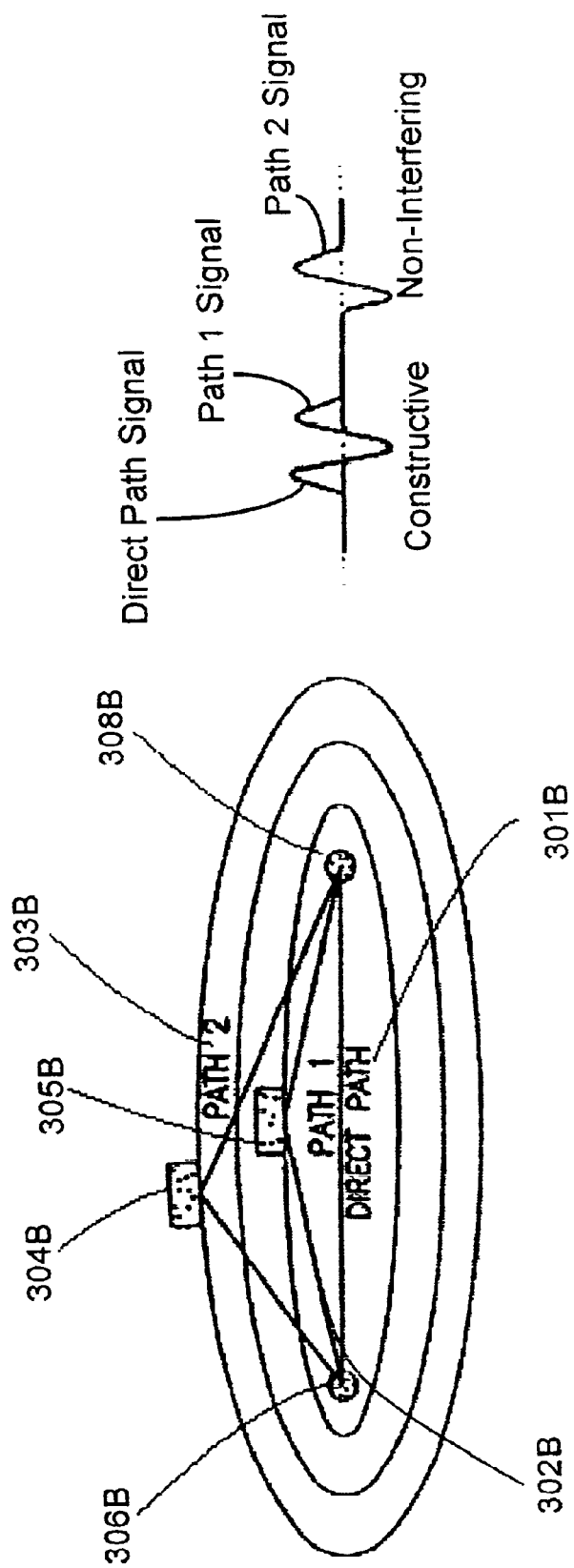

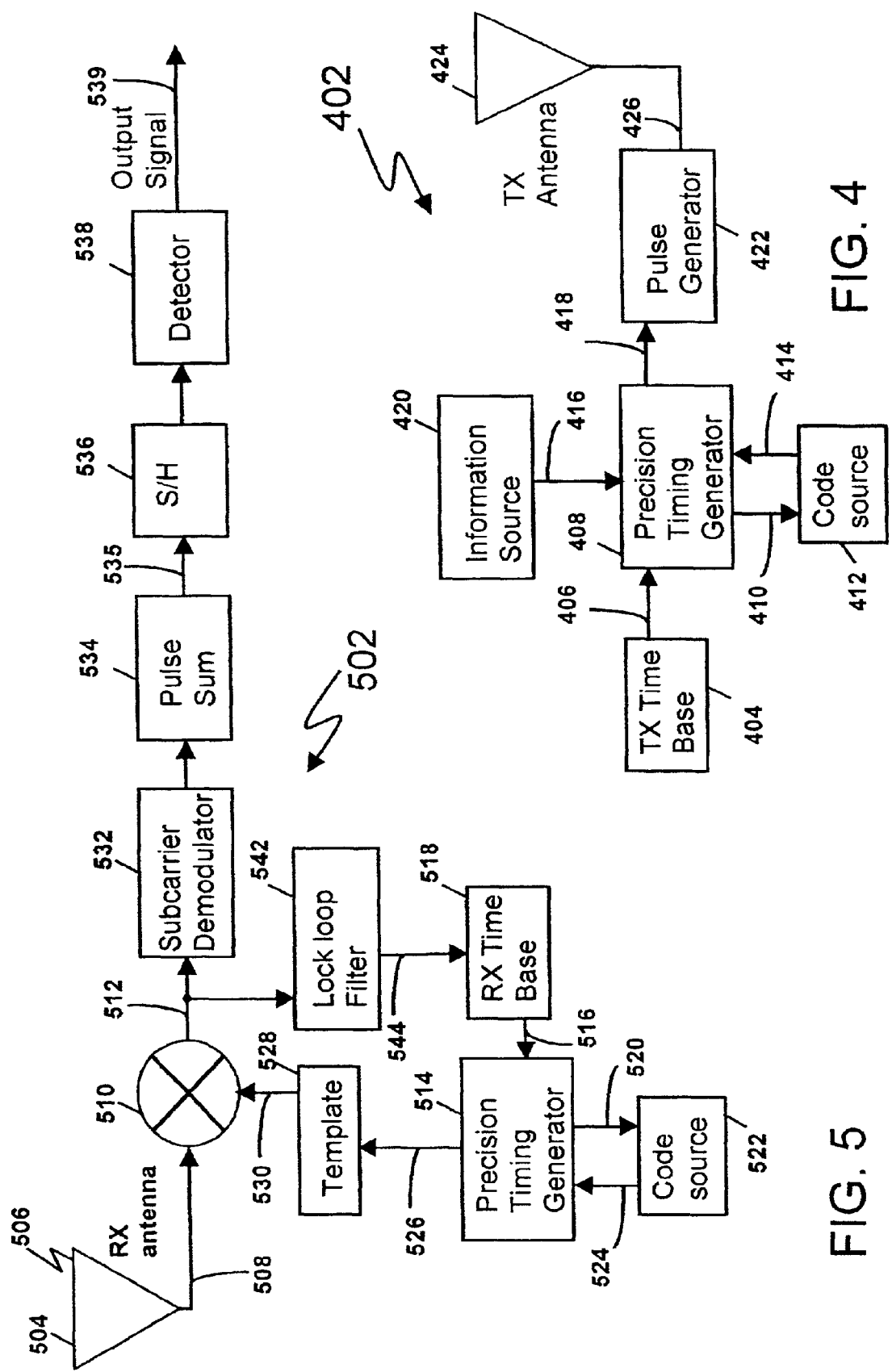

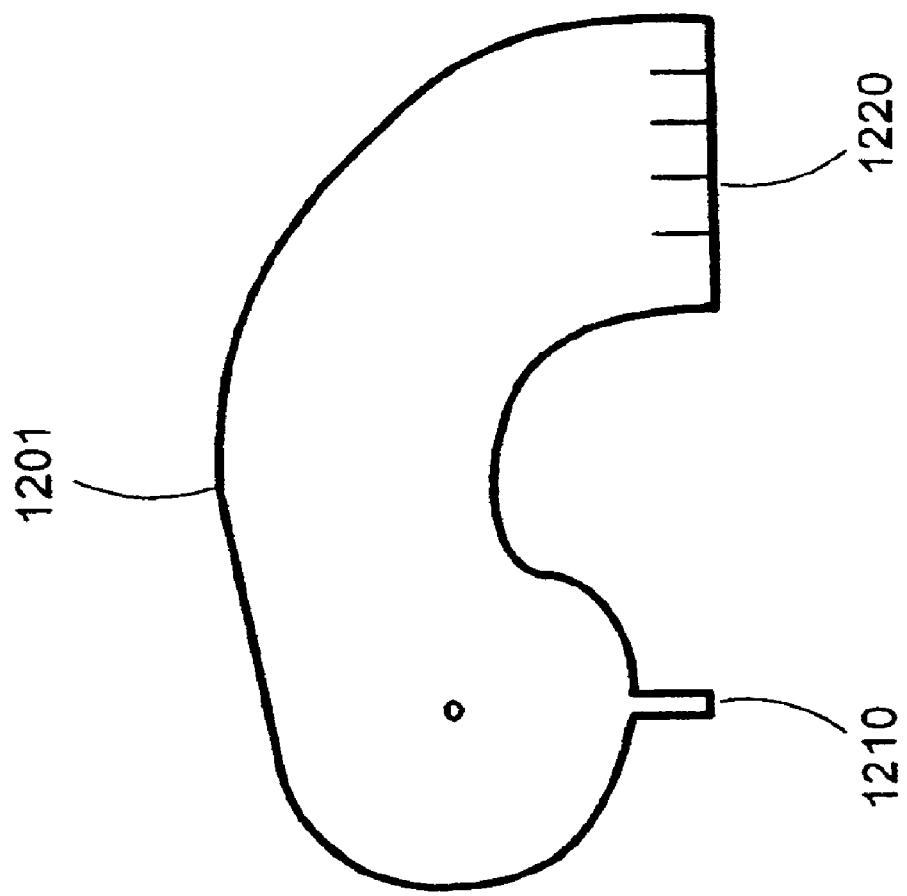

IMPULSE RADAR ANTENNA ARRAY AND METHOD

CROSS REFERENCE TO RELATED APPLICATIONS

This Application claims priority to U.S. Provisional Application Ser. No. 60/271,499, filed Feb. 26, 2001, and is a continuation of U.S. Non provisional Application Ser. No. 09/998,480, filed Nov. 30, 2001 now U.S. Pat. No. 6,667,724, which is incorporated by reference herein.

BACKGROUND

Law enforcement agencies often are confronted with hostage situations where armed intruders are barricaded inside a building. Officers on the scene generally have no means for determining the number and position of persons within the building, and are thus hampered in their efforts to resolve the situation. Similarly, law enforcement personnel planning a surprise raid on an armed compound would also greatly benefit from information related to the number and position of persons within. Such situational awareness decreases the amount of risk faced by the entering law enforcement personnel by decreasing the amount of unknowns. Furthermore, such a system would be of great use to rescue agency attempting to find survivors in cave-ins or collapsed buildings.

Prior attempts to provide law enforcement and rescue personnel with a priori knowledge of the occupants of a structure include acoustic, optical and infra-red (IR) detection systems. The acoustic solution is simply to have a very sensitive listening device (i.e. microphone), or array of them, and listen to determine if there were any noises coming from the room. However, without an array of directional devices, it is impossible to determine the location of the targets generating the sound. Furthermore, moving targets may not make enough sound to be detected.

The optical solution is to somehow, view the interior of the structure through a window, or to find a crack in the structure through which to view the interior, or actually drill a hole so that a camera of some sort could be inserted and the room surveilled. The drawbacks of this solution are that it takes time to find a crack or drill a hole and it is noisy to do so. Thus, in a hostage or raid situation, the law enforcement personnel could lose the tactical advantage of surprise by virtue of lack of stealth. Additionally, view through a window or crack may only provide a limited field of view, and so, parts of the room may be hidden. Moreover, if the room is smoke filled then this solution is ineffective. Finally, the IR solution is basically a thermal mapping solution. However this cannot be implemented as a through wall device, one must have a direct view of the room. Furthermore, for obvious reasons IR devices are rendered ineffective in fire-fighting scenarios.

On the other hand, ultra wideband (UWB) radars exhibit many desirable features that would be advantageous in those sorts of environments, such as high range resolution, low processing sidelobes, excellent clutter rejection capability, and the ability to scan distinct range windows. Additionally, the technique of time modulated UWB (TM-UWB) adds decreased range ambiguities and increased resistance to spoofing or interference. Impulse radar can operate on wavelengths capable of penetrating typical non-metallic construction material. These advantages make impulse radar particularly beneficial in short range, high clutter environments. Thus, impulse radars have beneficial applicability in environments where vision is obscured by obstacles such as walls, rubble, or smoke, and fire. Various embodiments of impulse radar have been described in co-owned U.S. Pat. No. 4,743,906, issued to Fullerton, May 10, 1988; U.S. Pat. No. 4,813,057, issued to Fullerton, Mar. 14, 1989; and U.S. Pat. No. 5,363,108, issued to Fullerton, Nov. 8, 1994, all of which are incorporated herein by reference. Moreover, arrays of such radars have been developed for such uses as high resolution detection and intruder alert systems, as described in co-owned U.S. Pat. No. 6,218,979B1, issued to Barnes, et al. Apr. 17, 2001; and U.S. Pat. No. 6,177,903, issued to Fullerton, et al Jan. 23, 2001, respectively, both of which are incorporated herein by reference. These systems benefit from being low-power, non-interfering, and yet capable of scanning through typical, non-metallic building material.

However, as indicated in the described patents, those implementations comprise two or more radar systems making them not easily transportable. The above-described scenarios benefit from ease of transport and stealth. Recent advances in ultra wideband radio technology have enabled the development of radar platforms that allow a single operator to detect and monitor targets through walls, rubble or other material.

A need, therefore, exists for a system that allows detection of moving targets through walls or other non-metallic building material, but capable of transport and operation by one user. Necessary to such a single-user system is a component for transmitting and receiving that will not jeopardize the operational suitability of the overall radar device, but at the same time, permit the scan of a wide field of view with high target resolution and minimal target ambiguities, or ghosts. Such a component must also enable the tracking of multiple targets in both azimuth and range in order to provide the best situational information to the user.

SUMMARY OF THE INVENTION

The present invention is directed to an antenna array that satisfies this need. The antenna array comprises a ground plane and a plurality of antenna elements. A version of the invention has the plurality of elements mounted onto the ground plane in two parallel rows, one row dedicated to transmitting signals, the opposing row dedicated to receiving signals. An alternative version of the invention comprises equal numbers of transmitting elements and receiving elements such that there are even pairs of transmitting and receiving elements.

A version of the invention employs an ultra wideband antenna element with a radially constant phase front. However, an alternative version uses antenna elements that do not exhibit a symmetric response in at least one plane. Thus, in this version, the transmitting elements are oriented 180° in relation to a corresponding receiving element.

A further version of the invention seeks to achieve a uniform response pattern from all radiating and receiving elements by placing a parasitic material at each end of the transmitting and receiving rows. In one version of this alternative, the parasitic material is a dummy, or non-energized, antenna element. Still another embodiment, mounts the antenna elements to achieve horizontal signal polarization.

Another version of the present invention, mounts the elements to the ground plane such that inter-element spacing is substantially unique. Another version mounts the elements such that each element is off-set from its neighboring element in order to permit closer spacing, or, in the alternative, mounts the elements such that they are obliquely rotated with respect to neighboring elements.

Another version employs a reflective fence structure affixed to the ground plane between the transmitting and receiving rows. The fence structure may linear plane or it may comprise a curvi-linear surface. Another embodiment of the invention comprises a ground plane with curved or rolled edges.

A further version of the present invention uses antenna elements comprising feed tab structures. A version also comprises co-planar waveguides disposed upon the side of the ground plane opposite the side to which the antenna elements are mounted. A version has the co-planar waveguides in communication with the antenna elements through the ground plane at the feed tab structure. A further version comprises co-planar waveguides that are of substantially unique lengths.

A version of the present invention comprises a radome intended to overlay the array. Said radome may comprise a semi-cylindrical departure from the plane of the radome such that when over-laid on the array, the transmitting row fits with a hollow formed by the departure. Another version of the present invention also comprises a radome with acoustic bumpers mounted thereon, in addition to, or as, stand-offs.

A method for use of the array is also disclosed herein that overcomes a problem of element spacing to achieve reduced cross-range, or azimuthal, ambiguities. This method comprises the step of pairing a non-vertically aligned transmitting and receiving elements.

BRIEF DESCRIPTION OF THE DRAWINGS

These and other features, aspects, and advantages of the present invention will become better understood with regard to the following description, appended claims, and accompanying drawings where:

FIG. 2A illustrates a pulse train comprising pulses as in FIG. 1A;

FIG. 2B illustrates the frequency domain amplitude of the waveform of FIG. 2A;

FIG. 2C illustrates the pulse train spectrum;

FIG. 2D is a plot of the Frequency vs. Energy Plot and points out the coded signal energy spikes;

FIG. 3B depicts a typical geometrical configuration giving rise to multipath received signals;

FIG. 3C illustrates exemplary multipath signals in the time domain;

FIG. 4 illustrates a representative impulse radio transmitter functional diagram;

FIG. 5 illustrates a representative impulse radio receiver functional diagram;

FIG. 12 shows an exemplary antenna element comprising a feed tab structure.

DETAILED DESCRIPTION OF THE PRESENT INVENTION

Figure 1A:
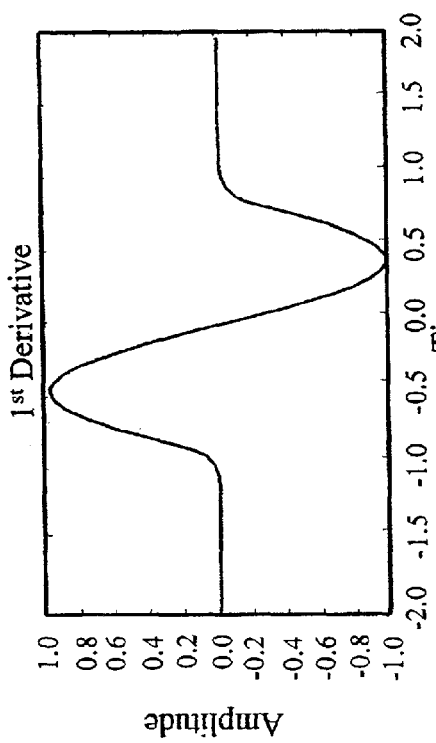
FIG. 1A illustrates a representative Gaussian Monocycle waveform in the time domain.
Figure 1B:
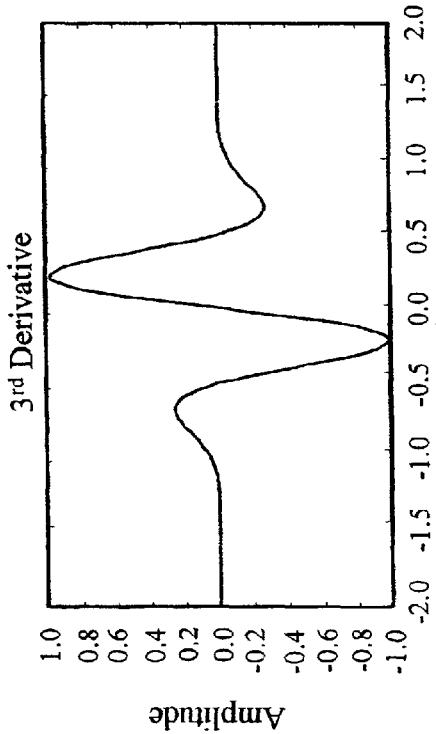
FIG. 1B illustrates the frequency domain amplitude of the Gaussian Monocycle of FIG. 1A.
Figure 1C:
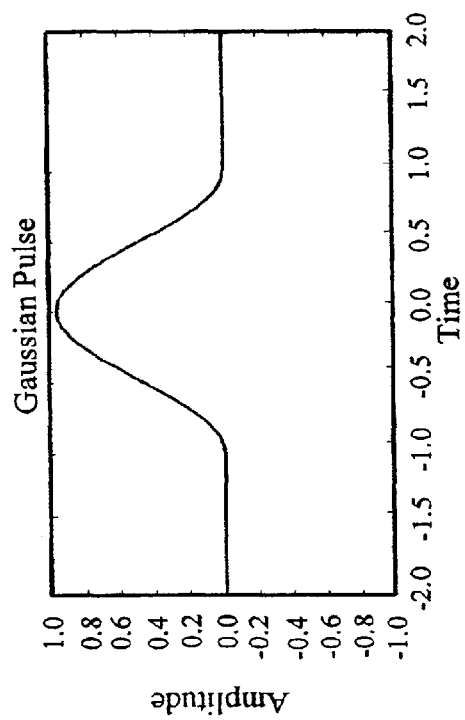
FIG. 1C represents the second derivative of the Gaussian Monocycle of FIG. 1A.
Figure 1D:
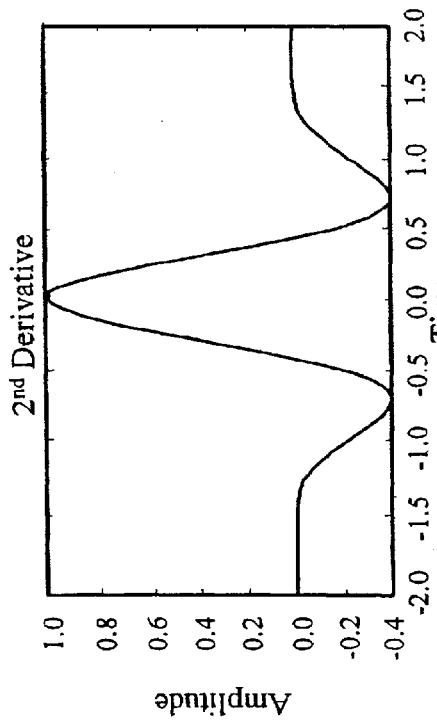
FIG. 1D represents the third derivative of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

1. Ultra Wideband/Impulse Radars

Recent advances in radio frequency technology have enabled ultra wideband technology (UWB) or impulse radio systems .To better understand the benefits of impulse radio to the present invention, the following review of impulse radio follows. Impulse radio has been described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), and U.S. Pat. No. 5,832,035 (issued Nov. 3, 1998) to Fullerton et al. All of the above listed patents are incorporated by reference herein.

It should be understood that the terminology 'impulse radio' is used primarily for historical convenience and that the terminology can be generally interchanged with the terminology 'impulse system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation, time-shift modulation (also referred to as pulse-position modulation or pulse-interval modulation) and Many versions of these. In this document, the time-shift modulation method is often used as an illustrative example. However, someone skilled in the art will recognize that alternative modulation approaches may, in some instances, be used instead of or in combination with the time-shift modulation approach.

In impulse radio, inter-pulse spacing may be held constant or may be varied on a pulse-by-pulse basis by information, a code, or both. In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Figure 1E:
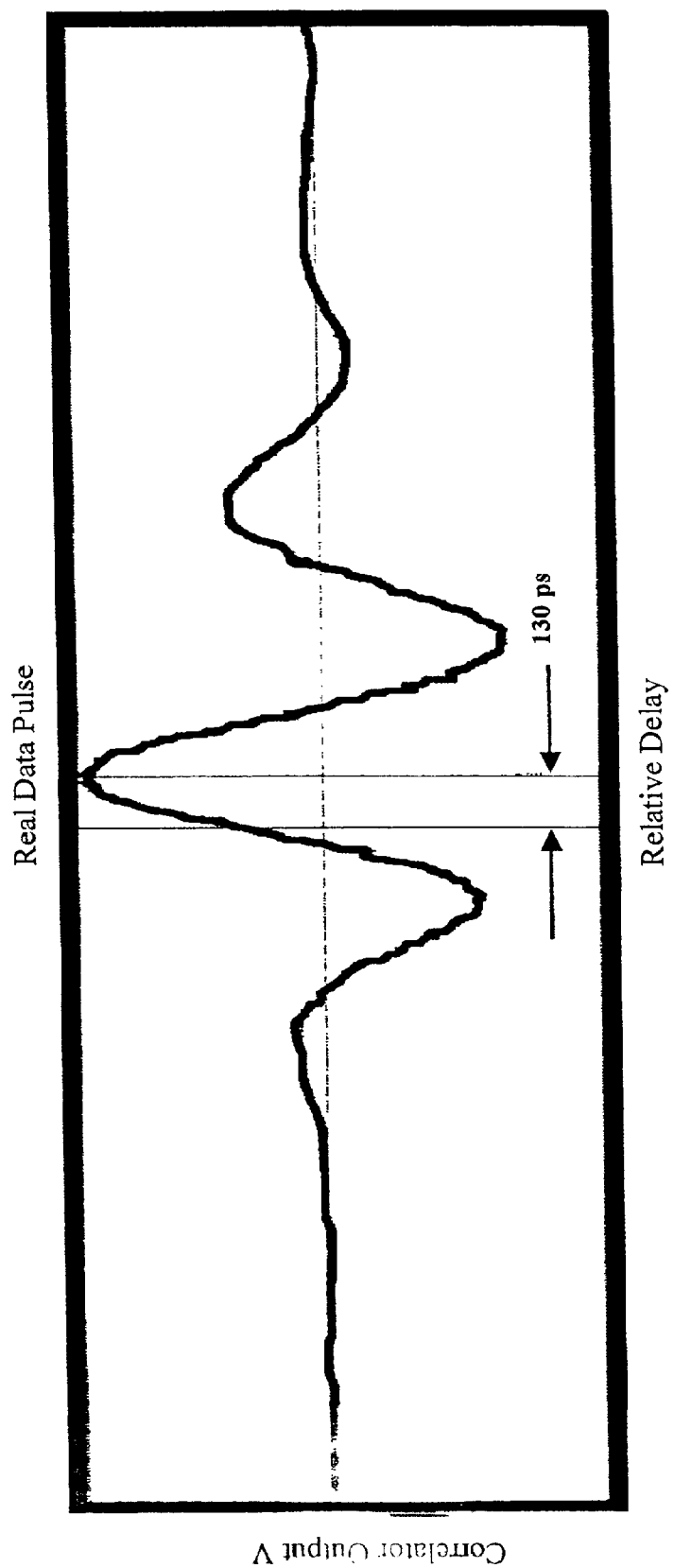
FIG. 1E represents the Correlator Output vs. the Relative Delay in a real data pulse.

Impulse transmission systems are based on short, low duty-cycle pulses. Different pulse waveforms, or pulse types, may be employed to accommodate requirements of various applications. Typical pulse types include a Gaussian pulse, pulse doublet (also referred to as a Gaussian monocycle), pulse triplet, and pulse quadlet as depicted in FIGS. 1A through 1D, respectively. An actual received waveform that closely resembles the theoretical pulse quadlet is shown in FIG. 1E. A pulse type may also be a wavelet set produced by combining two or more pulse waveforms (e.g., a doublet/triplet wavelet set). These different pulse types may be produced by methods described in the patent documents referenced above or by other methods, as persons skilled in the art would understand.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where $\sigma$ is a time scaling parameter, t is time, and e is the natural logarithm base.

Figure 1F:
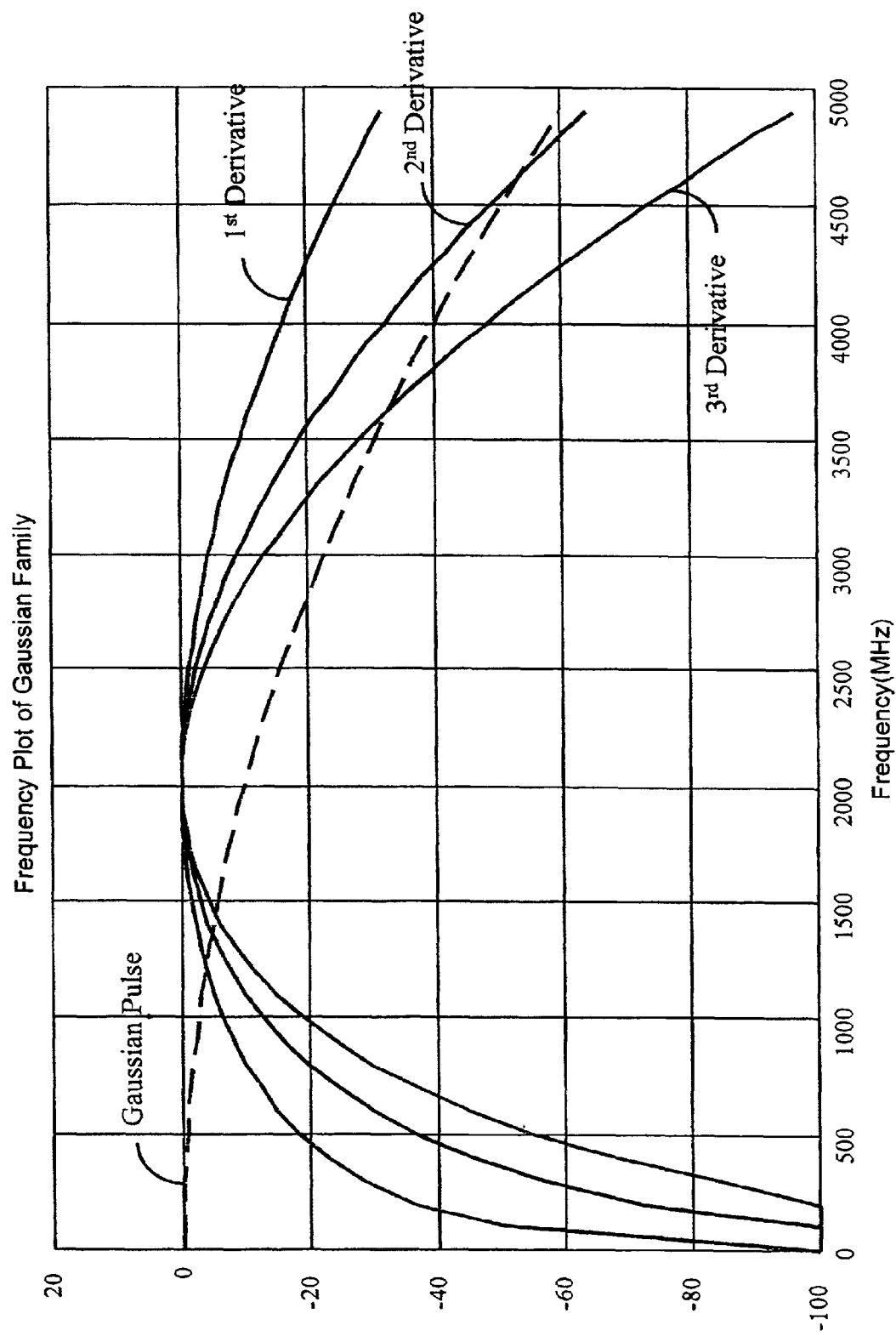
FIG. 1F depicts the frequency plot of the Gaussian family of the Gaussian Pulse and the first, second, and third derivative.

The power special density of the Gaussian monocycle is shown in FIG. 1F, along with spectrums for the Gaussian pulse, triplet, and quadlet. The corresponding equation for the Gaussian monocycle is:

$$F_{mono}(f) = (2\pi)^{\frac{3}{2}}\sigma f e^{-2(\pi\sigma f)^2}$$

The center frequency ($f_c$), or frequency of peak spectral density, of the Gaussian monocycle is:

$$f_c = \frac{1}{2\pi\sigma}$$

It should be noted that the output of an ultra-wideband antenna is essentially equal to the derivative of its input. Accordingly, since the pulse doublet, pulse triplet, and pulse quadlet are the first, second, and third derivatives of the Gaussian pulse, in an ideal model, an antenna receiving a Gaussian pulse will transmit a Gaussian monocycle and an antenna receiving a Gaussian monocycle will provide a pulse triplet.

Coding

Impulse transmission systems may communicate one or more data bits with a single pulse; however, typically each data bit is communicated using a sequence of pulses, known as a pulse train. As described in detail in the following example system, the impulse transmitter produces and outputs a train of pulses. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems typically have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = (-1)^f a \sum_j \omega(ct - jT_f, b)$$

where j is the index of a pulse within a pulse train, $(-1)^f$ is polarity (+/−), a is pulse amplitude, b is pulse type, c is pulse width, $\omega(t, b)$ is the normalized pulse waveform, and $T_f$ is pulse repetition time.

The energy spectrum of a pulse train signal over a frequency bandwidth of interest may be determined by summing the phasors of the pulses at each frequency, using the following equation:

$$A(\omega) = \left| \sum_{i=1}^{n} \frac{e^{j\Delta t}}{n} \right|$$

where $A(\omega)$ is the amplitude of the spectral response at a given frequency, $\omega$ is the frequency being analyzed ($2\pi f$), $\Delta t$ is the relative time delay of each pulse from the start of time period, and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Specialized coding techniques can be employed to specify temporal and/or non-temporal pulse characteristics to produce a pulse train having certain spectral and/or correlation properties. For example, by employing a PN code to vary inter-pulse spacing, the energy in the comb lines presented in FIG. 2B can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Coding provides a method of establishing independent transmission channels. Specifically, families of codes can be designed such that the number of pulse coincidences between pulse trains produced by any two codes will be minimal. Generally, keeping the number of pulse collisions minimal represents a substantial attenuation of the unwanted signal.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they do not depend on receiving every transmitted pulse. Impulse radio receivers perform a correlating, synchronous receiving function (at the RF level) that uses statistical sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

Besides providing channelization and energy smoothing, coding makes impulse systems highly resistant to interference and jamming or spoofing by enabling discrimination between intended impulse transmissions and interfering transmissions. This property is desirable since impulse systems must share the energy spectrum with conventional radio systems and with other impulse systems.

Figure 3A:
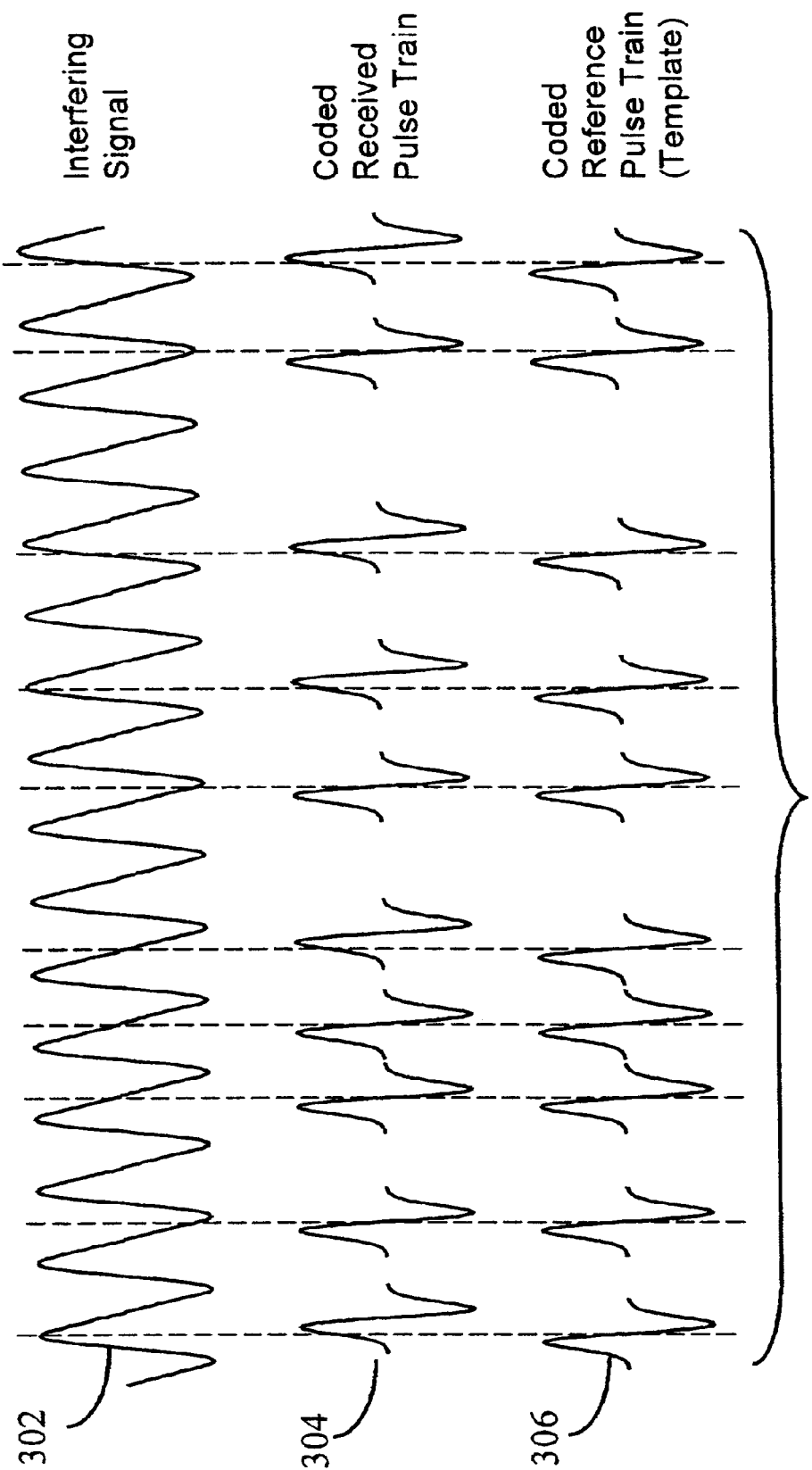
FIG. 3A illustrates representative signals of an interfering signal, a coded received pulse train and a coded reference pulse train.

FIG. 3A illustrates the result of a narrow band sinusoidal interference signal 302 overlaying an impulse radio signal 304. At the impulse radio receiver, the input to the cross correlation would include the narrow band signal 302 and the received ultrawide-band impulse radio signal 304. The input is sampled by a correlator template signal 306 positioned in accordance with a code. Without coding, the correlation would sample the interfering signal 302 with such regularity that the interfering signals could cause interference to the impulse radio receiver. However, when the transmitted impulse signal is coded and the impulse radio receiver template signal 306 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 KHz information bandwidth and a 10 MHz channel bandwidth yields a processing gain of 1000, or 30 dB. However, far greater processing gains are achieved by impulse radio systems, where the same 10 KHz information bandwidth is spread across a much greater 2 GHz channel bandwidth, resulting in a theoretical processing gain of 200,000, or 53 dB.

Capacity

It can be shown theoretically, using signal-to-noise arguments, that thousands of simultaneous channels are available to an impulse radio system as a result of its exceptional processing gain.

The average output signal-to-noise ratio of the impulse radio may be calculated for randomly selected time-hopping codes as a function of the number of active users, $N_u$, as:

$$SNR_{out}(N_u) = \frac{(N_s A_1 m_p)^2}{\sigma_{rec}^2 + N_s \sigma_a^2 \sum_{k=2}^{N_u} A_k^2}$$

where $N_s$ is the number of pulses integrated per bit of information, $A_k$ models the attenuation of transmitter k's signal over the propagation path to the receiver, and $\sigma_{rec}^2$ is the variance of the receiver noise component at the pulse train integrator output. The monocycle waveform-dependent parameters $m_p$ and $\sigma_a^2$ are given by $$m_p = \int_{-\infty}^{\infty} \omega(t)[\omega(t) - \omega(t-\delta)]dt$$

and $$\sigma_a^2 = T_f^{-1} \int_{-\infty}^{\infty} \left[\int_{-\infty}^{\infty} \omega(t-s)v(t)dt\right]^2 ds,$$

where $\omega(t)$ is the monocycle waveform, $v(t)=\omega(t)-\omega(t-\delta)$ is the template signal waveform, $\delta$ is the time shift between the monocycle waveform and the template signal waveform, $T_f$ is the pulse repetition time, and s is signal.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents the majority of the potential coverage area of a radio system. In a mobile system, received signal strength fluctuates due to the changing mix of multipath signals that vary as its position varies relative to fixed transmitters, mobile transmitters and signal-reflecting surfaces in the environment.

Impulse radios, however, can be substantially resistant to multipath effects. Impulses arriving from delayed multipath reflections typically arrive outside of the correlation time and, thus, may be ignored. This process is described in detail with reference to FIGS. 3B and 3C. FIG. 3B illustrates a typical multipath situation, such as in a building, where there are many reflectors 304B, 305B. In this figure, a transmitter 306B transmits a signal that propagates along three paths, the direct path 301B, path 1 302B, and path2 303B, to a receiver 308B, where the multiple reflected signals are combined at the antenna. The direct path 301B, representing the straight-line distance between the transmitter and receiver, is the shortest. Path 1 302B represents a multipath reflection with a distance very close to that of the direct path. Path 2 303B represents a multipath reflection with a much longer distance; Also shown are elliptical (or, in space, ellipsoidal) traces that represent other possible locations for reflectors that would produce paths having the same distance and thus the same time delay.

FIG. 3C illustrates the received composite pulse waveform resulting from the three propagation paths 301B, 302B, and 303B shown in FIG. 3B. In this figure, the direct path signal 301B is shown as the first pulse signal received. The path 1 and path 2 signals 302B, 303B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

Figure 3D:
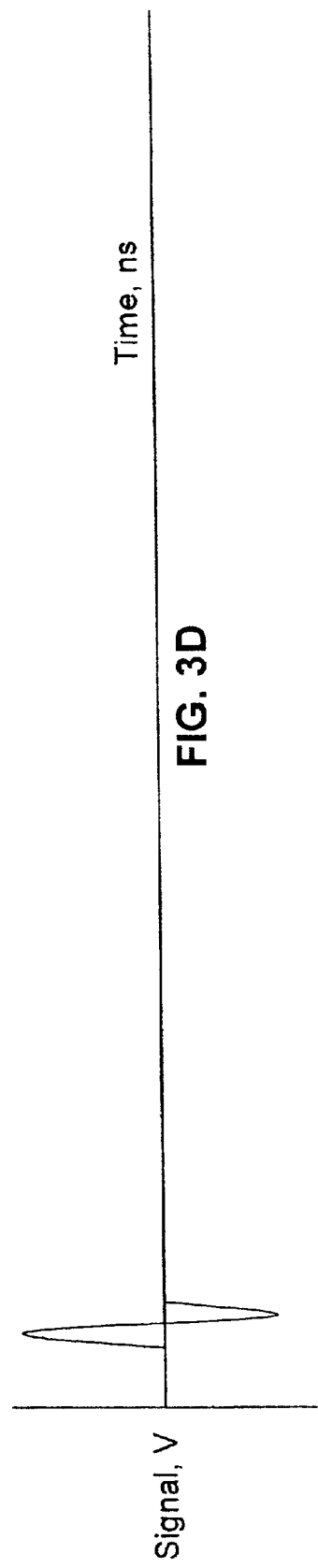
FIGS. 3D–3F illustrate a signal plot of various multipath environments.
Figure 3E:
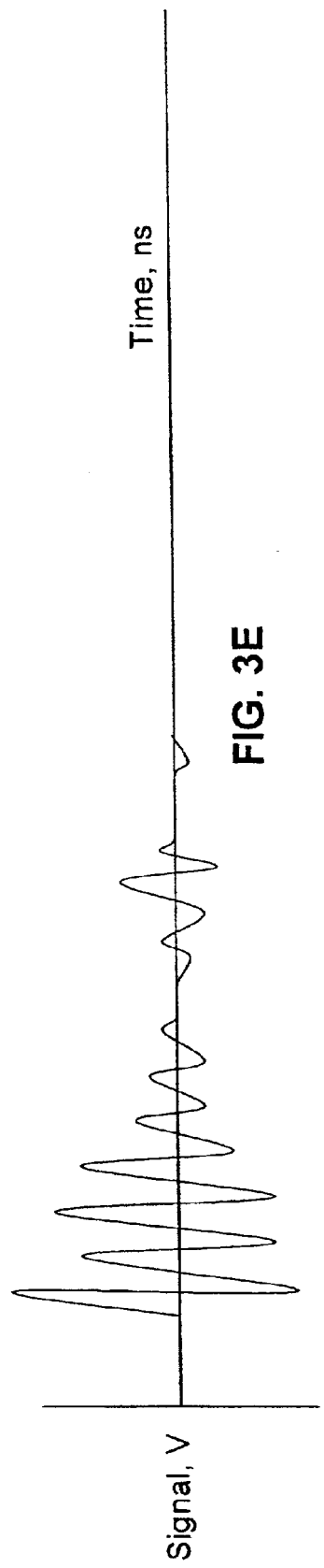
Figure 3F:
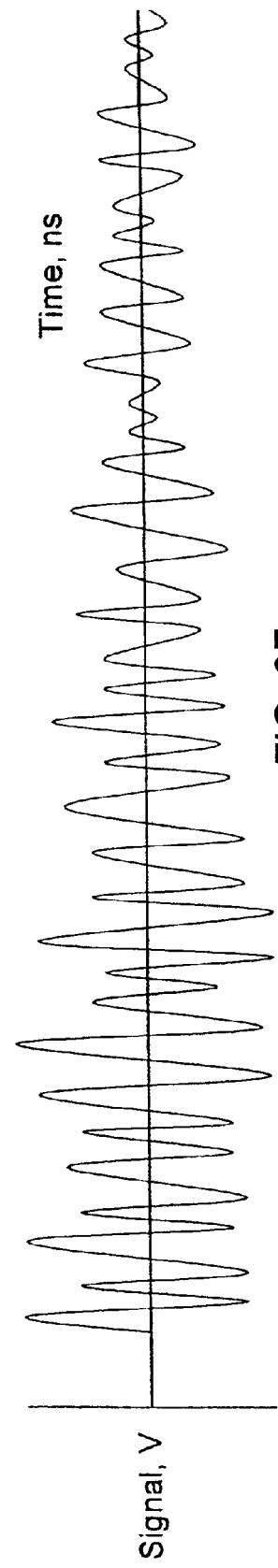

FIGS. 3D, 3E, and 3F represent the received signal from a TM-UWB transmitter in three different multipath environments. These figures are approximations of typical signal plots. FIG. 3D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 3E illustrates an intermediate multipath environment. This approximates the response from one room to the next in a building. The amplitude of the direct path signal is less than in FIG. 3D and several reflected signals are of significant amplitude. FIG. 3F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 3E. In this situation, the direct path signal power is small relative to the total signal power from the reflections.

Figure 3G:
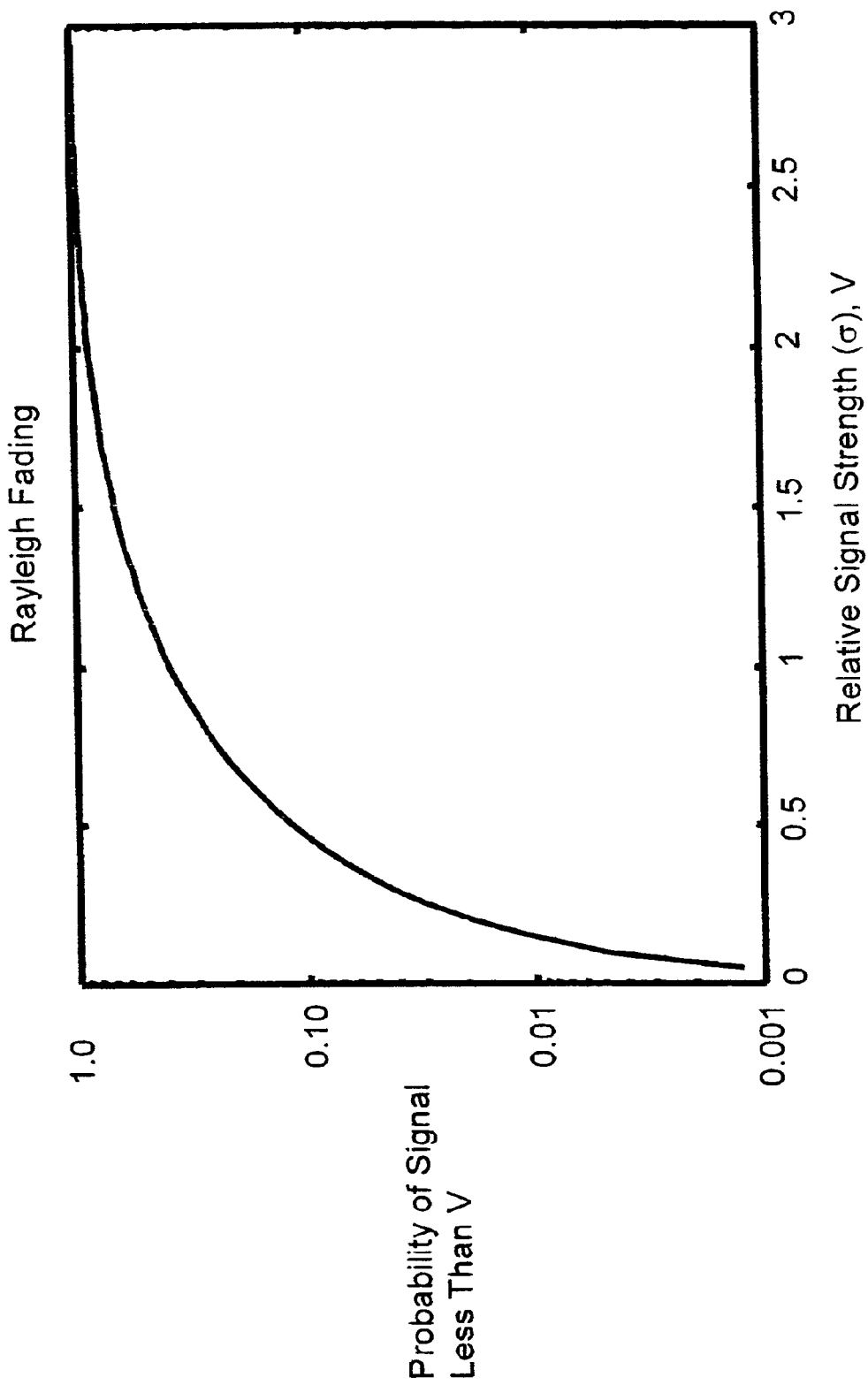
FIG. 3G illustrates the Rayleigh fading curve associated with non-impulse radio transmissions in a multipath environment.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Where the system of FIG. 3B is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sigma(2)^{1/2}$ is the RMS power of the combined multipath signals. The Rayleigh distribution curve in FIG. 3G shows that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 3H:
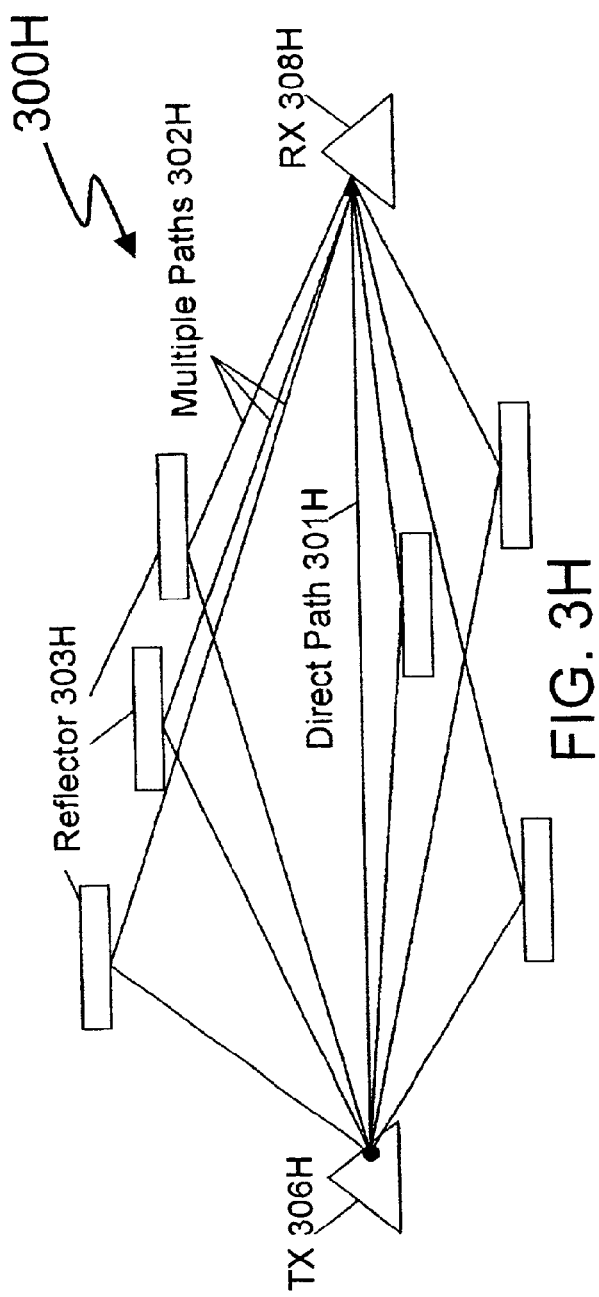
FIG. 3H illustrates a plurality of multipaths with a plurality of reflectors from a transmitter to a receiver.
Figure 3I:
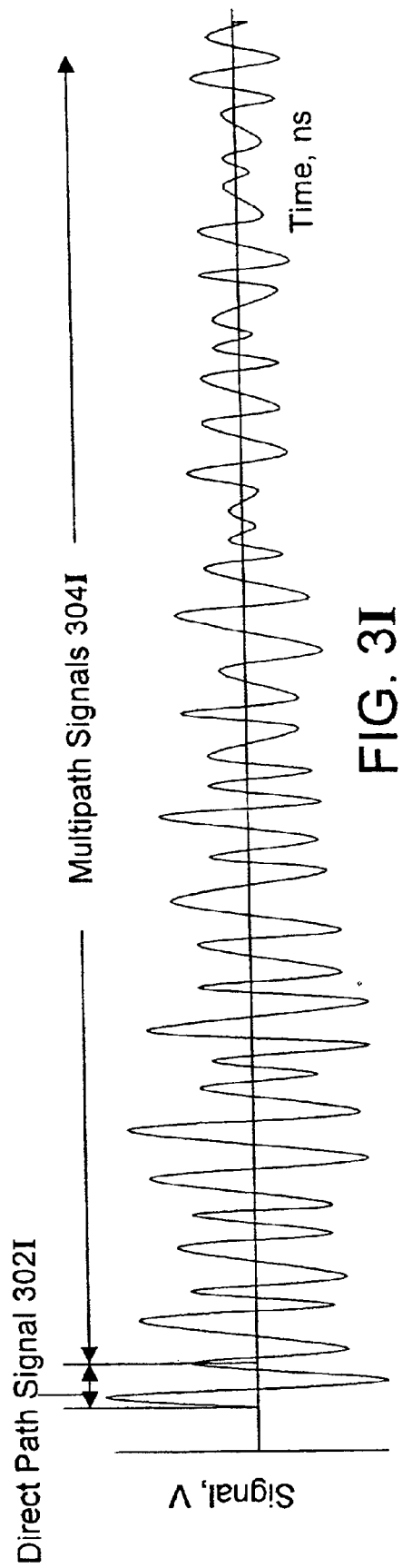
FIG. 3I graphically represents signal strength as volts vs. time in a direct path and multipath environment.

In a high multipath environment such as inside homes, offices, warehouses, automobiles, trailers, shipping containers, or outside in an urban canyon or other situations where the propagation is such that the received signal is primarily scattered energy, impulse radio systems can avoid the Rayleigh fading mechanism that limits performance of narrow band systems, as illustrated in FIGS. 3H and 3I. FIG. 3H depicts an impulse radio system in a high multipath environment 300H consisting of a transmitter 306H and a receiver 308H. A transmitted signal follows a direct path 301H and reflects off reflectors 303H via multiple paths 302H. FIG. 3I illustrates the combined signal received by the receiver 308H over time with the vertical axis being signal strength in volts and the horizontal axis representing time in nanoseconds. The direct path 301H results in the direct path signal 302I while the multiple paths 302H result in multipath signals 304I. In the same manner described earlier for FIGS. 3B and 3C, the direct path signal 302I is sampled, while the multipath signals 304I are not, resulting in Rayleigh fading avoidance.

Exemplary Transceiver Implementation

Transmitter

An exemplary embodiment of an impulse radio transmitter 402 of an impulse radio communication system having an optional subcarrier channel will now be described with reference to FIG. 4.

The transmitter 402 comprises a time base 404 that generates a periodic timing signal 406. The time base 404 typically comprises a voltage controlled oscillator (VCO), or the like, having a high timing accuracy and low jitter, on the order of picoseconds (ps). The control voltage to adjust the VCO center frequency is set at calibration to the desired center frequency used to define the transmitter's nominal pulse repetition rate. The periodic timing signal 406 is supplied to a precision timing generator 408.

The precision timing generator 408 supplies synchronizing signals 410 to the code source 412 and utilizes the code source output 414, together with an optional, internally generated subcarrier signal, and an information signal 416, to generate a modulated, coded timing signal 418.

An information source 420 supplies the information signal 416 to the precision timing generator 408. The information signal 416 can be any type of intelligence, including digital bits representing voice, data, imagery, or the like, analog signals, or complex signals.

A pulse generator 422 uses the modulated, coded timing signal 418 as a trigger signal to generate output pulses. The output pulses are provided to a transmit antenna 424 via a transmission line 426 coupled thereto. The output pulses are converted into propagating electromagnetic pulses by the transmit antenna 424. The electromagnetic pulses are called the emitted signal, and propagate to an impulse radio receiver 502, such as shown in FIG. 5, through a propagation medium. In a preferred embodiment, the emitted signal is wide-band or ultra wideband, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio communication system is now described with reference to FIG. 5.

The receiver 502 comprises a receive antenna 504 for receiving a propagated impulse radio signal 506. A received signal 508 is input to a cross correlator or sampler 510, via a receiver transmission line, coupled to the receive antenna 504. The cross correlation 510 produces a baseband output 512.

The receiver 502 also includes a precision timing generator 514, which receives a periodic timing signal 516 from a receiver time base 518. This time base 518 may be adjustable and controllable in time, frequency, or phase, as required by the lock loop in order to lock on the received signal 508. The precision timing generator 514 provides synchronizing signals 520 to the code source 522 and receives a code control signal 524 from the code source 522. The precision timing generator 514 utilizes the periodic timing signal 516 and code control signal 524 to produce a coded timing signal 526. The template generator 528 is triggered by this coded timing signal 526 and produces a train of template signal pulses 530 ideally having waveforms substantially equivalent to each pulse of the received signal 508. The code for receiving a given signal is the same code utilized by the originating transmitter to generate the propagated signal. Thus, the timing of the template pulse train matches the timing of the received signal pulse train, allowing the received signal 508 to be synchronously sampled in the correlator 510. The correlator 510 preferably comprises a multiplier followed by a short term integrator to sum the multiplier product over the pulse interval.

The output of the correlator 510 is coupled to a subcarrier demodulator 532, which demodulates the subcarrier information signal from the optional subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 534. A digital system embodiment is shown in FIG. 5. In this digital system, a sample and hold 536 samples the output 535 of the pulse summation stage 534 synchronously with the completion of the summation of a digital bit or symbol. The output of sample and hold 536 is then compared with a nominal zero (or reference) signal output in a detector stage 538 to provide an output signal 539 representing the digital state of the output voltage of sample and hold 536.

The baseband signal 512 is also input to a lowpass filter 542 (also referred to as lock loop filter 542). A control loop comprising the lowpass filter 542, time base 518, precision timing generator 514, template generator 528, and correlator 510 is used to generate an error signal 544. The error signal 544 provides adjustments to the adjustable time base 518 to position in time the periodic timing signal 526 in relation to the position of the received signal 508.

In a transceiver embodiment, substantial economy can be achieved by sharing part or all of several of the functions of the transmitter 602 and receiver 502. Some of these include the time base 518, precision timing generator 514, code source 522, antenna 504, and the like.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Exemplary Radar Device

Figure 6:
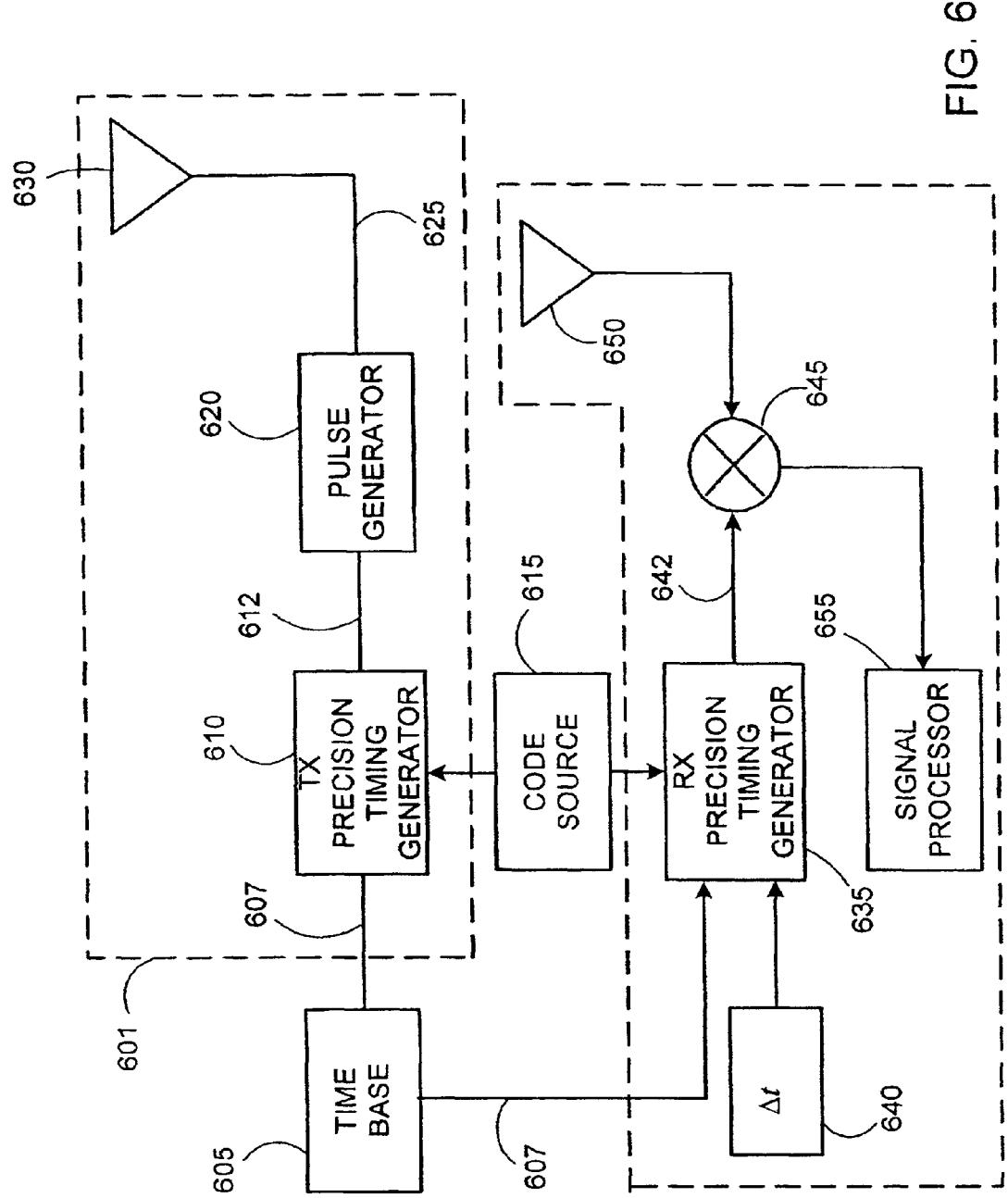
FIG. 6 depicts an exemplary radar device device.

With reference to FIG. 6, a transmit component 601 is comprised of a timing base 605 that provides a precise timing signal 607 coupled to a transmitting precision timing generator 610 which positions individual pulses in time in accordance with a signal from a pseudo-noise code source 615. The depicted architecture does not show an information source 420 shown in FIG. 4, however, it should be noted that data could be modulated for transmission in the outgoing signal. The timing generator output 612 is received by a pulse generator 620 which generates the impulse signal 625 that is sent to the transmitting antenna 630 for conversion to an emitted signal.

Inapposite to the exemplary transceiver configurations described with reference to FIGS. 4 and 5, the same timing means provides timing control for the receive component 602 as well. In other words, the same time base 605 is coupled to a receive-side precision timing generator 635 which positions individual sampling pulses in time. The receive-side precision timing generator 635 also receives a signal from the pseudo-noise code source 615. A timing delay 640 is also fed to the receive-side precision timing generator 635 to delay the output some Δt with respect to the transmitted signal in order to develop the necessary ranging information from the return waveforms. This signal 642 is output to a correlator 645, or mixer, or sampler, which samples the signal received from the receiving antenna 650. The result of the correlation step is sent to a signal processor for range and azimuth determination.

2. Ultra Wideband Radar Antenna Array

Figure 7:
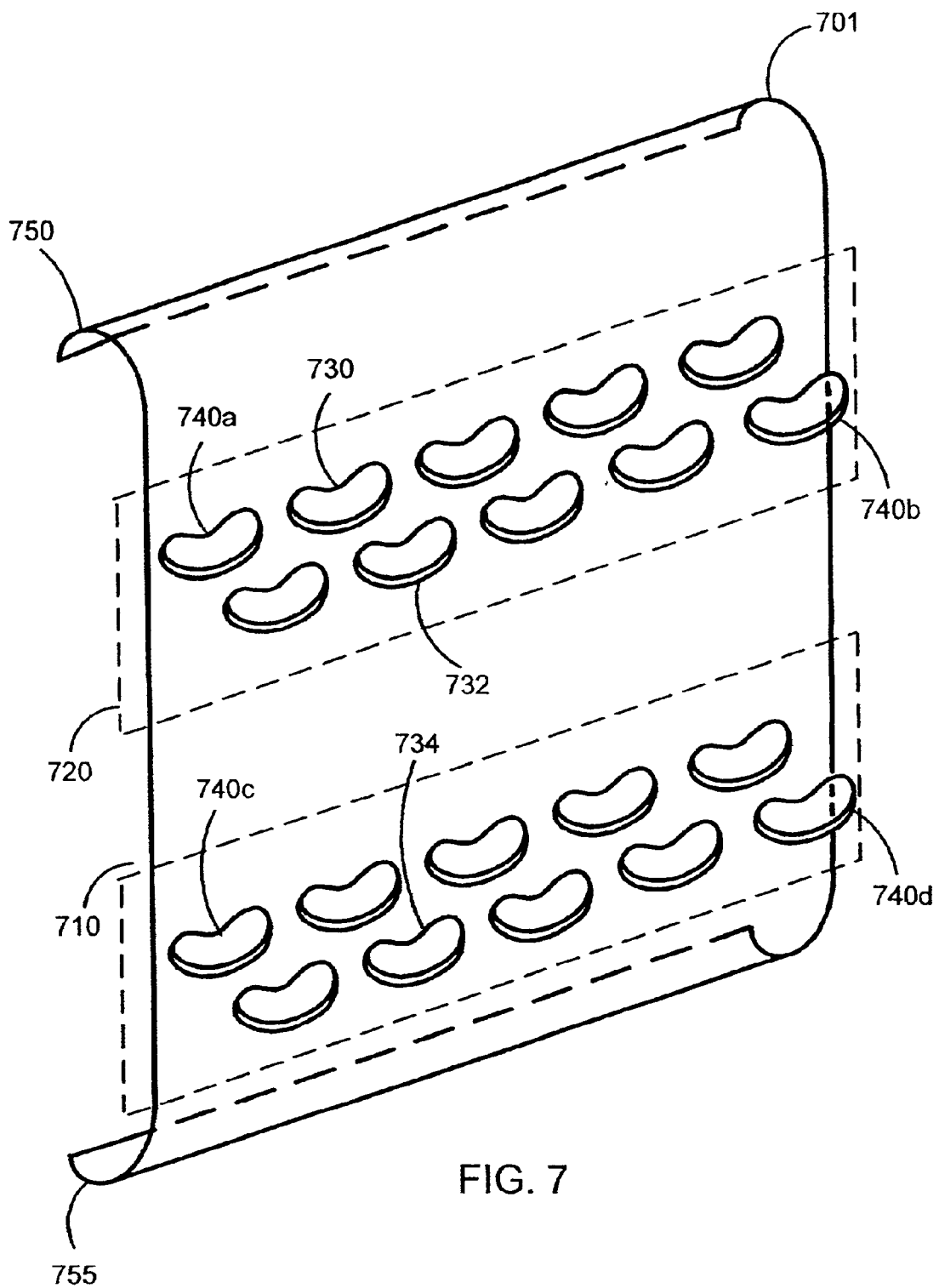
FIG. 7 shows a perspective view of an embodiment in accordance with the present invention.

FIG. 7 depicts a perspective view of one embodiment of the present invention. The array is comprised of a ground plane 701 on which are mounted two parallel rows 720, 710 of antenna elements 730. One row 710 is dedicated to transmitting only and is known hereinafter as the transmitting row. The opposing row 720 is receive-only and will be referred to as the receiving row. Each row of elements is comprised of UWB antenna elements of a size suitable for a characteristic wavelength of a signal emission in a given application. It should be noted that, as used in this description, the ground plane can be comprised of multiple layers, including a back plane, a layer comprising digital control lines for the sensor head electronics (SHE), and/or another ground plane.

The antenna elements are disposed upon the ground plane such that an element in the transmitting row has a corresponding element in the receiving row. For example, assuming that there are eight (8) transmitting elements in the transmitting row, there will be eight receiving elements in the receiving row. Each transmitting element 734 and its corresponding receiving element 732 are aligned in a plane that is perpendicular to the transmitting 710 and receiving 720 rows.

A preferred embodiment has each row containing dummy elements 740a, 740b, 740c, 740d, i.e., elements that are never active, affixed at both ends of each row. Inactive elements ensure that the response patterns of the transmitting and receiving elements remain substantially identical from element to element. The same effect could also result from using a fence affixed at the ends of the rows and perpendicular to the rows or 50 Ohm chip resistors, or electro-magnetically parasitic elements.

The preferred embodiment uses an antenna element known as a "monoloop" and similar that described in co-owned and co-pending U.S. patent applications Ser. No. 09/753,244, filed Jan. 2, 2001, which is incorporated by reference herein. However, alternatives include ultra wideband antennae of frequency band responses of 2 GHz or greater, adapted such that the pattern is consistent with the field of view the radar, typically approximately 120 degrees azimuth (−3 dB) or greater and well-matched to minimize reflection.

Ideally, such antennae comprise a precise, smooth, radially equidistant phase front in substantially all directions. In other words, the antenna used should exhibit no phase shift or phase distortion versus angle, in azimuth or elevation. However, if it does not, as in the case of the monoloop, a symmetric product response of communicating transmitting 734 and receiving 732 elements may be effected, for example, in the relative azimuthal plane. A given receiving element 732 in the receiving row 720 is oriented 180°, or flipped, relative to its corresponding transmitting element 734 in the transmitting row 710. This provides a symmetric antenna response pattern in both azimuth and elevation between communicating transmitting and receiving elements. Flipping opposing antennae also facilitates signal processing.

Polarization of the emitted energy depends upon the requirements of the device, the expected environment in which the device is expected to operate, and the overall application. However, in the preferred embodiment, horizontally polarized emissions provide improved results. The strength of the UWB radar return is stronger in general for targets comprised of people standing, kneeling and laying on the floor. Moreover, horizontal polarization is much less susceptible to blockage by vertical metal studs in walls and vertical pipes in walls compared to vertical polarization or circular polarization.

The number of element pairs used depends upon the application and the size requirements of the overall radar device upon which the array will be mounted. Two or more elements are preferred in order to accurately and unambiguously determine the azimuth of a target. Additionally, depending on the wall composition, some element pairs may be blocked by reflective material in transmitting medium. Thus instead of making the operator move to avoid the reflective material, with two or more element pairs, even if one of the pairs is blocked, the array may still provide accurate target information. The greater the number of element pairs, the better the likelihood of overcoming blockage. Further, more element pairs improves azimuth resolution.

It should be noted that although the embodiment described comprises matched pairs of transmitting a receiving elements, other embodiments may comprise less transmitting elements, even one transmitting element, for a plurality of receiving elements. However, there are two reasons for using equal numbers of transmit and receive elements. The first is blockage. If there was only one transmit element reflective material in the transmit medium could block its emissions rendering it ineffective. The user would have to reposition the radar. It should be noted that in many of the applications envisioned for this radar system, time and stealth are both beneficial. The second reason is accuracy. When the transmit element is located in the same vertical plane as the receive element, accuracy is maximized. If there were only one transmit element then most of the receive elements would incur some error in azimuth or ambiguity as compared to the element that is in the same vertical plane as the transmit element.

Additionally, by using multiple transmitting elements paired with multiple receiving elements, a switch between transmit and receive (T/R) switch is not required. If the same element was used for transmit and receive, a T/R switch would be required. A T/R switch, due to its stringent specifications, such as isolation from transmit to receive, or port-to-port isolation, is generally very expensive. Moreover, it may not be able to switch fast enough to permit scanning of close-in ranges, i.e. less than two feet. One embodiment of the radar platform is intended for use in closed environments, and some waveforms that can be used are longer than two nanoseconds, the waveform would have to be clipped. This truncation may eliminate some desired frequency components of the waveform. Also, the T/R switch could add undesirable noise to the transmit waveform.

The inter-element spacing can be uniform or non-uniform and is dependent, in part, upon size requirements of the overall device. However, it has been found that uniform spacing actually exacerbates any cross range ambiguities as they add together in phase or in time. By changing the element-to-element spacing, this periodicity is eliminated, thus reducing the cross range ambiguities. Optimally, each inter-element interval should be unique or substantially unique. A preferred method of determining element-to-element spacing is using Golomb's Ruler, however, other unequal element spacings could be effective as well. For example, choosing the spacings such that half of the elements add in phase and half add out of phase would also reduce the cross range ambiguity. Additionally, spacing based upon a logarithmic series will provide the same unique values.

Figure 8:
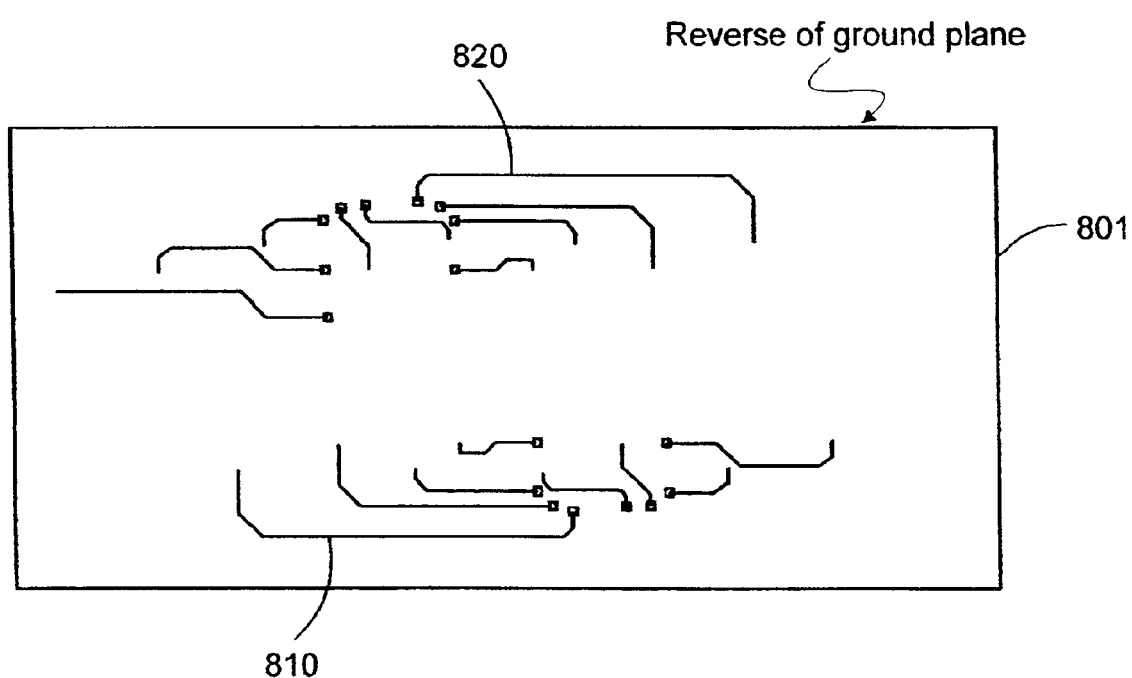
FIG. 8 shows the opposing surface of the ground plane in accordance with the present invention.

Referring to FIG. 8, rows of co-planar wave guides 810, 820 are connected to each element through the ground plane 801 couple the elements to the sensor head electronics (SHE). In non-UWB arrays, to obtain the desired broadside pattern, one would have to make all of these transmission lines lengths the same. However, as only one element pair is energized at a time and the waveforms of each element pair are added together, the transmission line lengths do not have to be equal. Unequal line lengths are compensated for. Some benefit is derived from the unequal transmit line lengths in terms of how the mismatch errors add by not having all transmission lines equal length. Again, use of a Golomb's' ruler algorithm, which is the optimum randomness that one can obtain to distribute unwanted errors, provides the best results. Additionally, lengths of the transmitting row co-planar wave guides 810 can have an equal match in the receiving row co-planar wave guides 820, however, the order is reversed.

Figure 9:
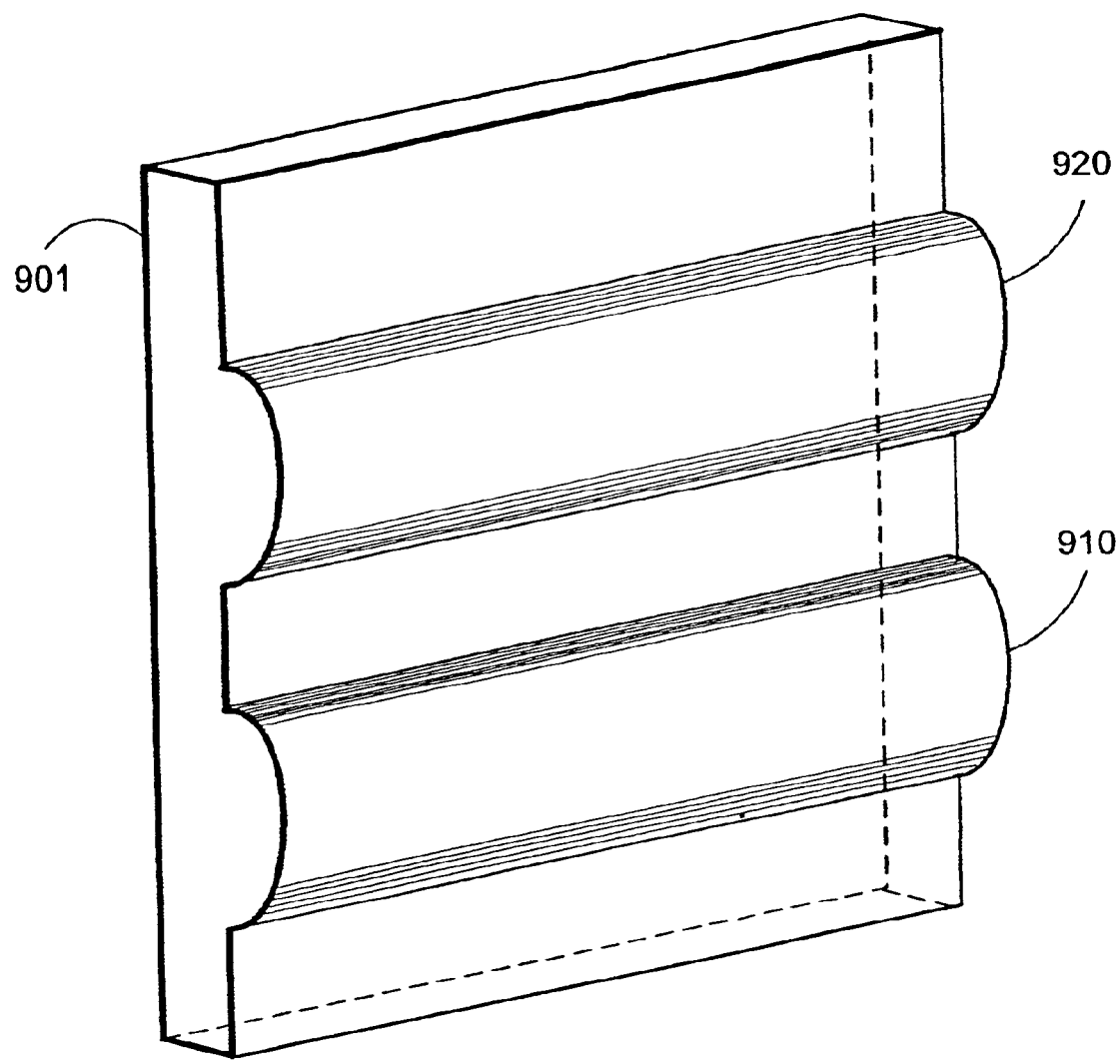
FIG. 9 shows a perspective view of a radome in accordance with the present invention.

FIG. 9 depicts a radome 901 for use with the array. A first semi-cylindrical departure 910 from the plane of the radome and a second semi-cylindrical departure 920 form hollows when the radome 901 is overlaid on the ground plane such that each antenna element row can be received therein. A cylindrical shape for the transmit row ensures that radiated energy is normal to the radome as it enters the transmit medium, reducing the amount of energy loss due to refraction or reflection, and, thus, maximizing signal transmission. Optionally, the radome may also comprise a cylindrical hollow to overlay the receive row in order to promote stability of the platform when it is placed against a wall. It is preferred that a low density, low dielectric, thermo/vacuum-formable material is used to form the radome section.

Figure 10A:
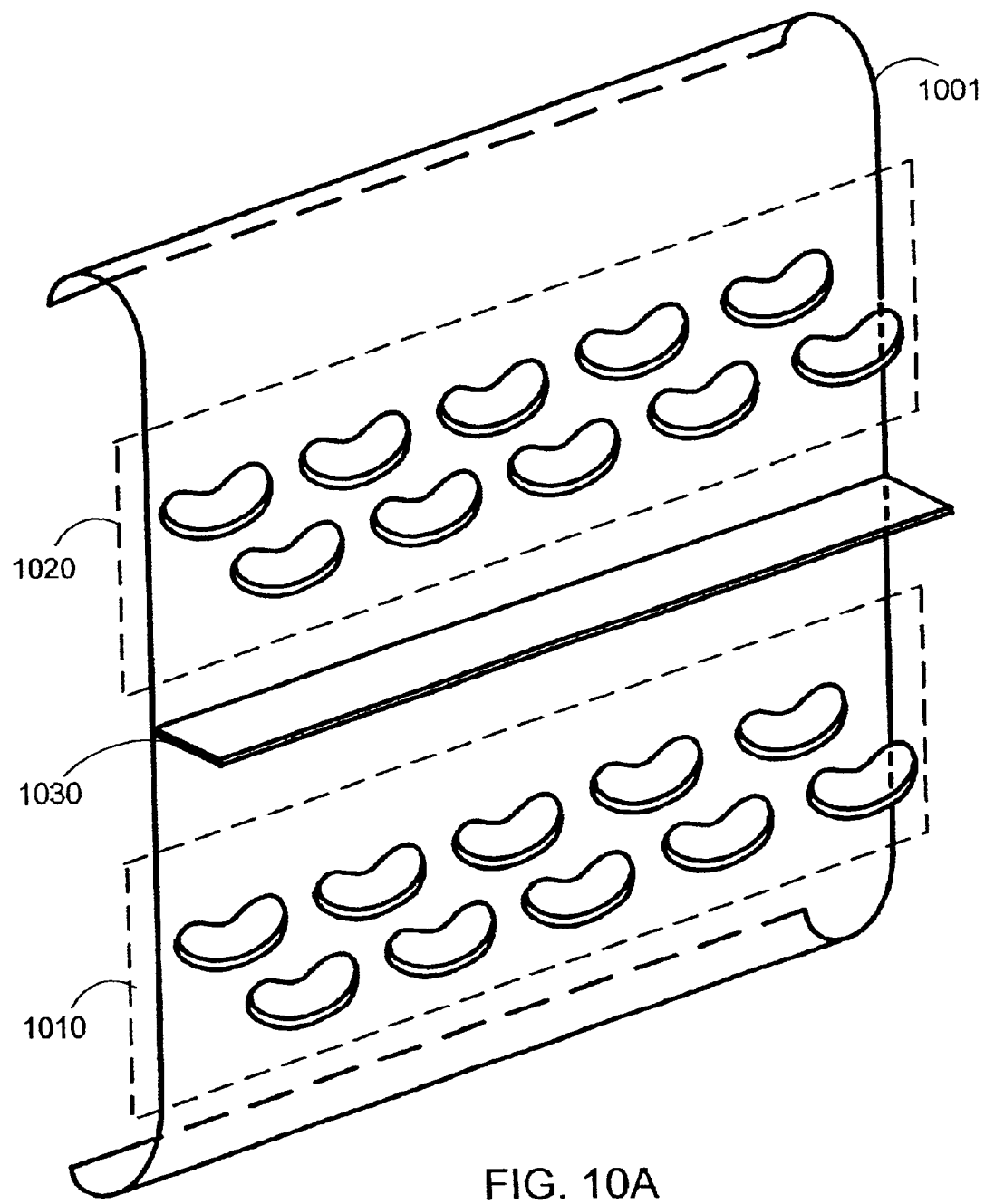
FIG. 10A depicts a perspective view of another version showing placement of a fence structure in accordance with the present invention.

An alternative embodiment also includes an RF fence 1030, shown in FIG. 10A, affixed to the ground plane 1001 between and parallel to the transmitting 1010 and receiving 1020 rows to reduce the transmit-to-receive antenna coupling and, thus, reduce the radar clutter residue. The RF Fence consists of either metal, resistive cards or resistive coatings on various substrates, or absorbing material either carbon based or ferrite based or some combination thereof. The most effective found was carbon-loaded foam backed by metal. Additionally, a frequency selective surface, or a very wide band, band-reject surface could be placed between the transmitting 1010 and receiving 1020 rows and create a very effective RF Fence. This could be used in conjunction with breaking the continuous ground plane between the transmitting row and the receiving row. Additionally, transmit-to-receive element coupling can be reduced by breaking the continuity of the ground plane alone.

Figure 10B:
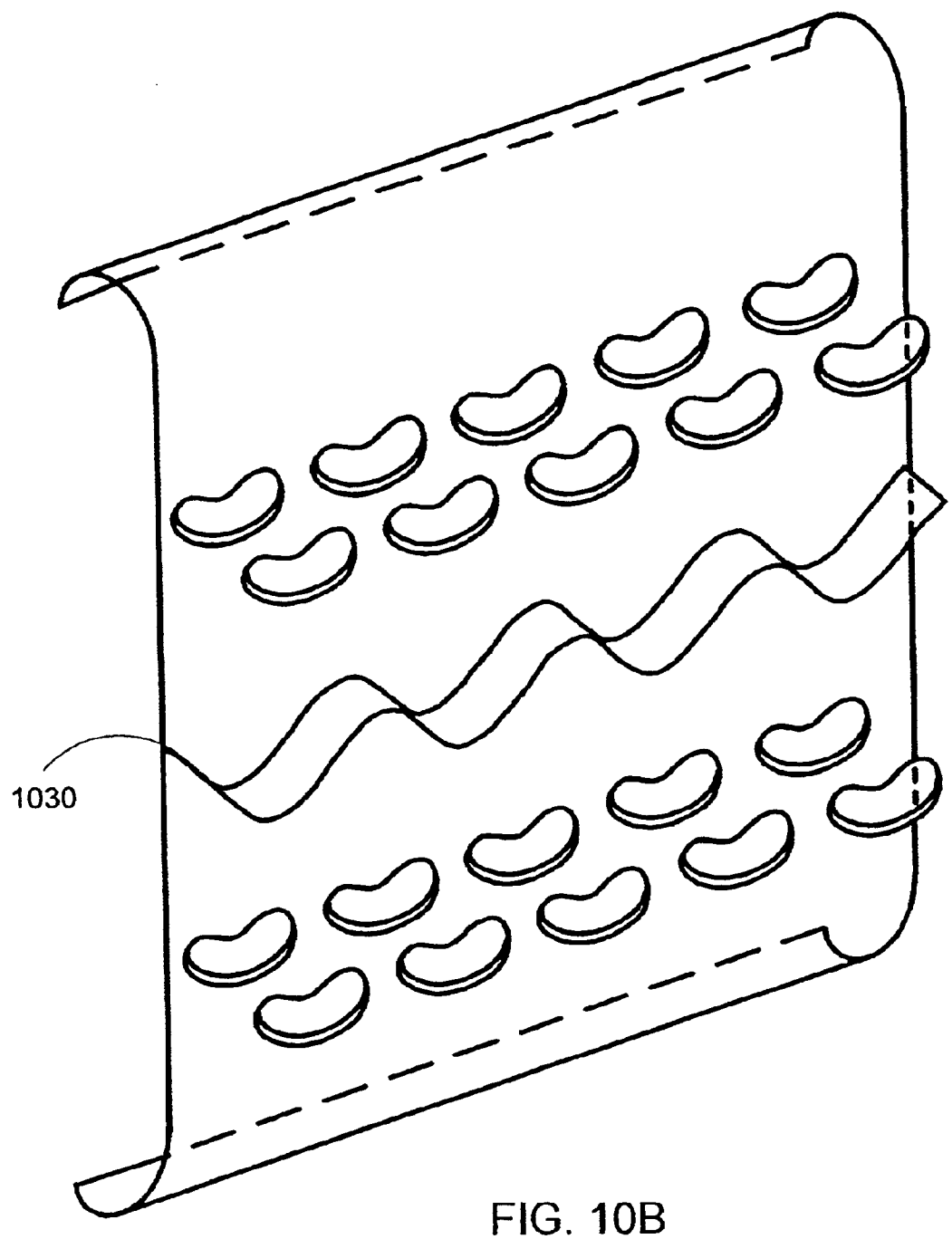
FIG. 10B depicts a perspective view of another version showing placement of a non-linear fence structure in accordance with the present invention.

FIG. 10B depicts a further embodiment that includes a non-linear, or curvi-linear RF fence structure 1040. Non-linear structures have been found to aid in the diffraction of energy and therefore, reduces element-to-element coupling. In has been discovered that one of the better configurations for non-linear RF fences was a sinusoidal with the RF fence shorted to the ground plane. This type of fence increases isolation of the transmit and receive elements due to the fact that it scatters the coupled energy differently for every transmitting element. A straight metallic fence of the same height increases isolation somewhat, but a sinusoidal fence performs significantly better. Preferably, the period of the sine wave should approximate the wavelength of the expected emission given antenna element size. Furthermore, element-to-element spacing should not be related to the sine wave in order to decrease the likelihood of coherency and increase dispersive effects of the fence.

The height of the RF fence structure can be determined using the following equation:

$$h_c = \frac{\lambda}{8*\cos\theta}$$

where $h_c$ is height, $\lambda$ is signal wavelength and $\theta$ is the maximum offset angle from normal. For example, a FOV of +/−60°, and a wavelength of 6 inches yields a fence height of 1.5 inches above the ground plane. The fence can be metallic, ferrite, dielectric, frequency selective surface (FSS), or absorber or some combination thereof.

Figure 11:
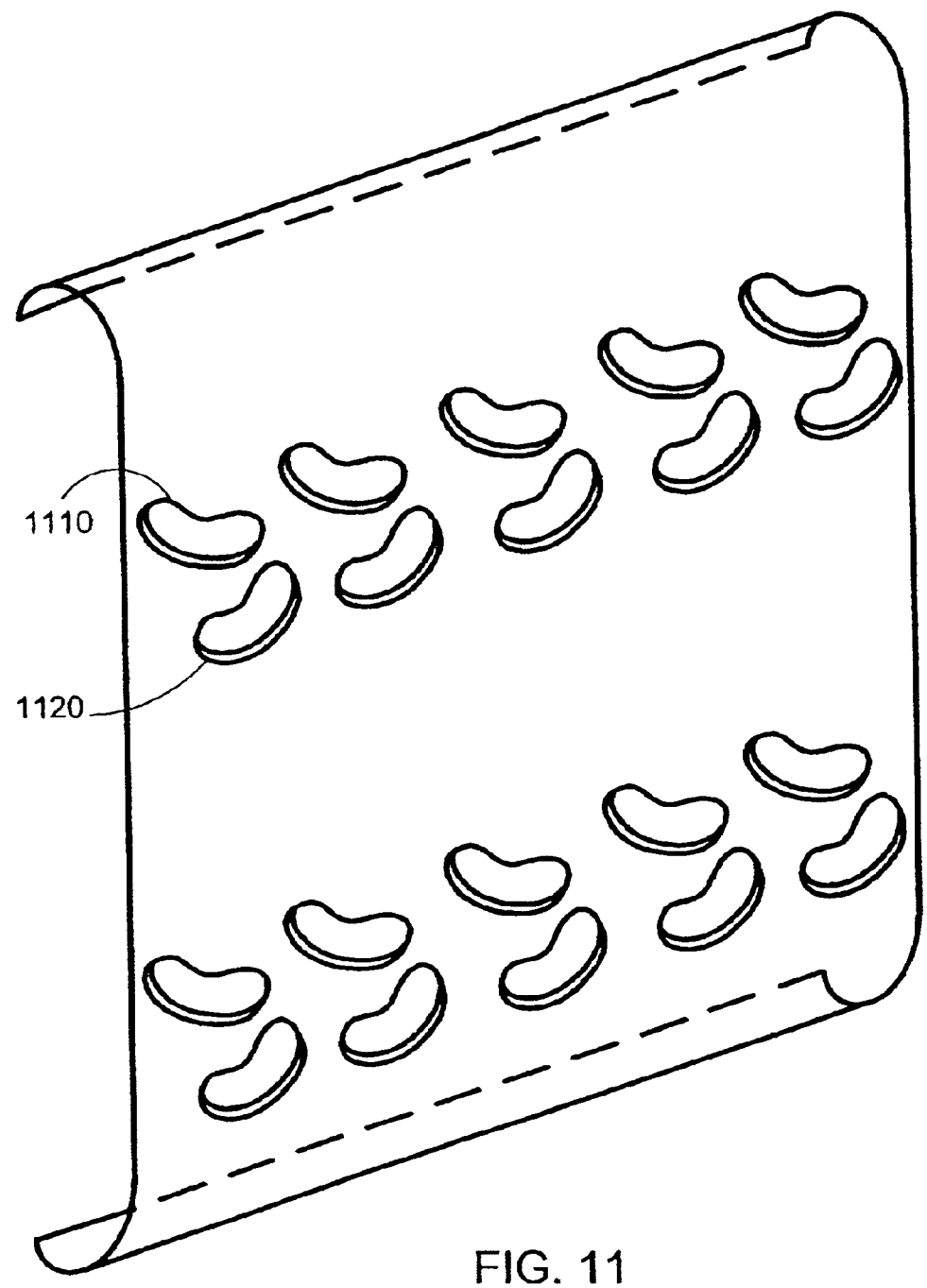
FIG. 11 shows another perspective view in accordance with the present invention.

Another alternative addresses the issue of size. For certain applications, wavelengths and operating frequencies may dictate a larger antenna element. However, device size restrictions may limit the feasibility of the multi-element design. To overcome this restriction, the antenna elements within a row may be laterally offset from a nominal row center line to allow room for a plurality of elements within the row. The amount of offset distance is dependent upon size requirements for the device, however, it has been shown that 0.5 inches achieves desirable results. In embodiments that employ matched pairs of transmitting and receiving elements, care should be taken to ensure that a corresponding element in the opposing row are offset the same amount and direction from a respective row center line. In the alternative to, or in conjunction with, element offsetting, each element could be affixed to the ground plane such that it is oriented obliquely to its neighboring element, the direction of rotation being alternated from element to element within a row as shown in FIG. 11. Each element 1110, 1120 could be alternatingly rotated 15 to 30 degrees, creating some space between adjacent ends of the elements without increasing the element-to-element spacing. This, however, does have some polarization ramifications that would have to be traded off between benefits gained by reduced mutual coupling and reduced element-to-element spacing.

The individual elements may be fed directly with the center pin of an SMA connector. Also, individual elements may be fed via a tab that is built into the element itself. As shown in FIG. 12, the element 1201 could comprise a feed tab 1210 which communicates with the co-planar wave guide 810, 820. The feed tab 1210 is soldered on the opposite side of the ground plane 701 to the center conductor of the built-in co-planar wave guides 810, 820. In addition, a dielectric shoulder can be built into the tab to facilitate the manufacturing process, by accurately locating the element at the correct height above the ground plane, and increasing the structural strength. It should be noted that in this exemplary embodiment, the opposite side of the element 1201 from the feed location can be soldered in four places, not only providing an excellent ground connection, but also providing considerable structural strength. Of course, connection specifics may vary for alternative antenna elements.

It has been noted that performance for some types of walls, (e.g. cinder block and metal stud walls) benefits from the distance the antenna elements are from the wall than just the radome itself would produce. In one embodiment, the radome holds the antenna element phase centers, or radiation centers, approximately 2.2 inches from the outside of the radome. For cinder blocks and walls with metal studs, 4 inches of separation from wall to antenna was found to give better performance in terms of minimizing transmission loss due to medium effects. Therefore, the radome may be configured with additional "stand-offs" to hold the antenna elements further from the wall.

The finite size of the ground plane, in particular in the vertical plane, may cause diffraction at the edge of the ground plane. In other words, when the radiated energy reaches the edge of the ground plane sudden termination of the plane may cause radiation or diffraction of the wave. It is expected that a user may hold the radar device such that the user's head may be in close proximity to the ground plane edge, and as the radar device may be a moving target indicator (MTI) type of detector, it would, therefore, be advantageous to reduce false alarms due to operator movement by reducing the radiation in the back hemisphere of the radar device. Constructing the ground plane 701 with rolled edges 750, 755 on the vertical ends of the ground plane 701, as shown in FIG. 7, alleviates this problem in that these two edges no longer cause the ground plane to behave like a discontinuity, but rather more like an infinite ground plane. This permits a smaller overall size of the ground plane to achieve the same decreased levels of back lobe radiation. It should be noted, however, that the determination of which end of the ground plane 701 includes the rolled edges 750, 755 is dependent upon the orientation of the antenna element rows 720, 710 with respect to the ground plane 701. As the elements 730 are disposed in rows, each element will be equidistant from an edge of the ground plane parallel to that row. Thus, energy from the antenna elements coherently adds at the parallel edge. The rolled edges will be most needed on that parallel end. Alternatively, RF fences, or manufacturing the ground plane such that the edges are non-linear, even serrated, could be used to decrease back lobe radiation.

It is anticipated that the radar device with which the disclosed array may be used will gain operational advantage by virtue of its being silent when in use. Bumpers may be added to the outside of the radome that can minimize the noise as radar device is placed against the wall. Materials exist that are low dielectric and would work as noise reducing cushion for this purpose, such as aerated rubber, aerated silicone and perhaps some types of polyvinyl or styrene foams.

Figure 13A:
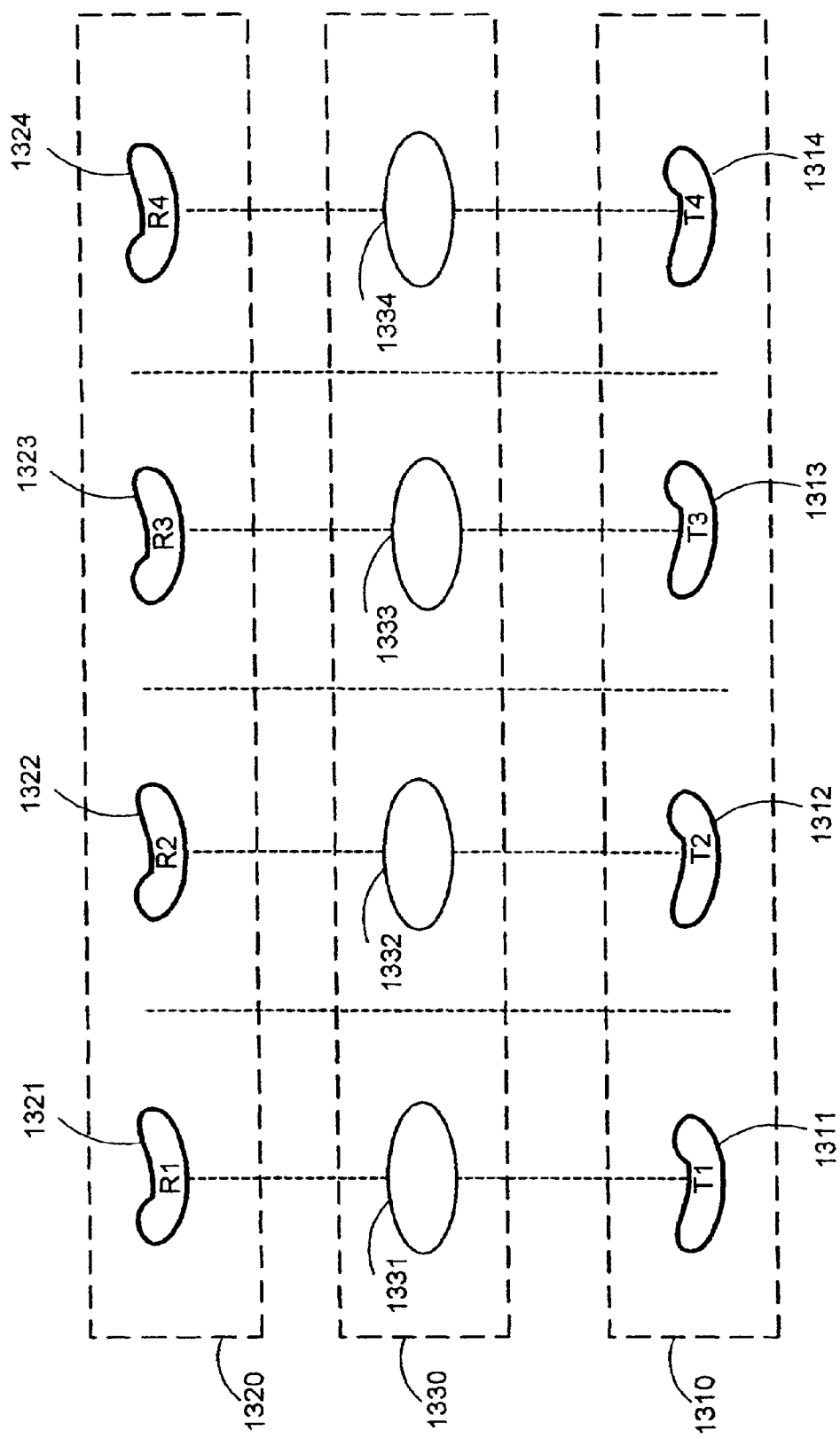
FIG. 13A depicts the concept of sampling points created by communicating vertically aligned element pairs.

In one embodiment requiring a compact ground plane, problems with cross-range ambiguities may arise. Cross range ambiguities are a function of the sample point spacing, or antenna element spacing, and radar field of view (FOV). With reference to FIG. 13A, elements in the transmitting row 1310 are labeled and number in accordance with their counterpart in the receiving row 1320. In other words, Transmitting Element 1 1311 corresponds to Receiving Element 1 1321 and so on. Typically, a sampling point 1331 in the vertical plane occur between, for example, Transmitting Element 1 1311 communicating with Receiving Element 1 1321. Thus, spacing between "sample points" 1330 is limited to the antenna element spacing in azimuth. For a +/−60 degree FOV antenna element spacing above a certain amount, can produce ambiguities inside the FOV. One solution is to, of course, decrease the antenna element spacing. This may not be feasible considering the type of antenna element, and the number of antenna elements pairs required for a given application. For instance, greater spacing may be preferable where larger elements are desired for improved frequency response.

Proper maximum antenna element spacing, S, to reduce cross-range ambiguities can be estimated by using the following formula:

$$S = \frac{\lambda}{2FOV} \quad (1)$$

where $\lambda$ is the wavelength at the highest frequency of interest, and FOV is expressed in radians. For example, for a FOV of 120 degrees, or $2\pi/3$ radians, and a wavelength of 6 inches, at a frequency of 2 GHz:

$$S=6/(2*2\pi/3) \sim 1.5 \text{ inches}$$

However, two techniques can be used to help mitigate cross range ambiguity when design requirements dictate antenna element spacing greater than that suggested by the formula. The first is purely a signal processing technique, which creates virtual sample points to reduce the cross range ambiguity by effectively reducing the antenna element spacing. Thus, with no additional measurements than what is required for the vertical pair algorithm, this would add significant additional signal processing to synthesize these additional sample points between the physical elements. However, this technique requires processing capacity that may be infeasible.

Figure 13B:
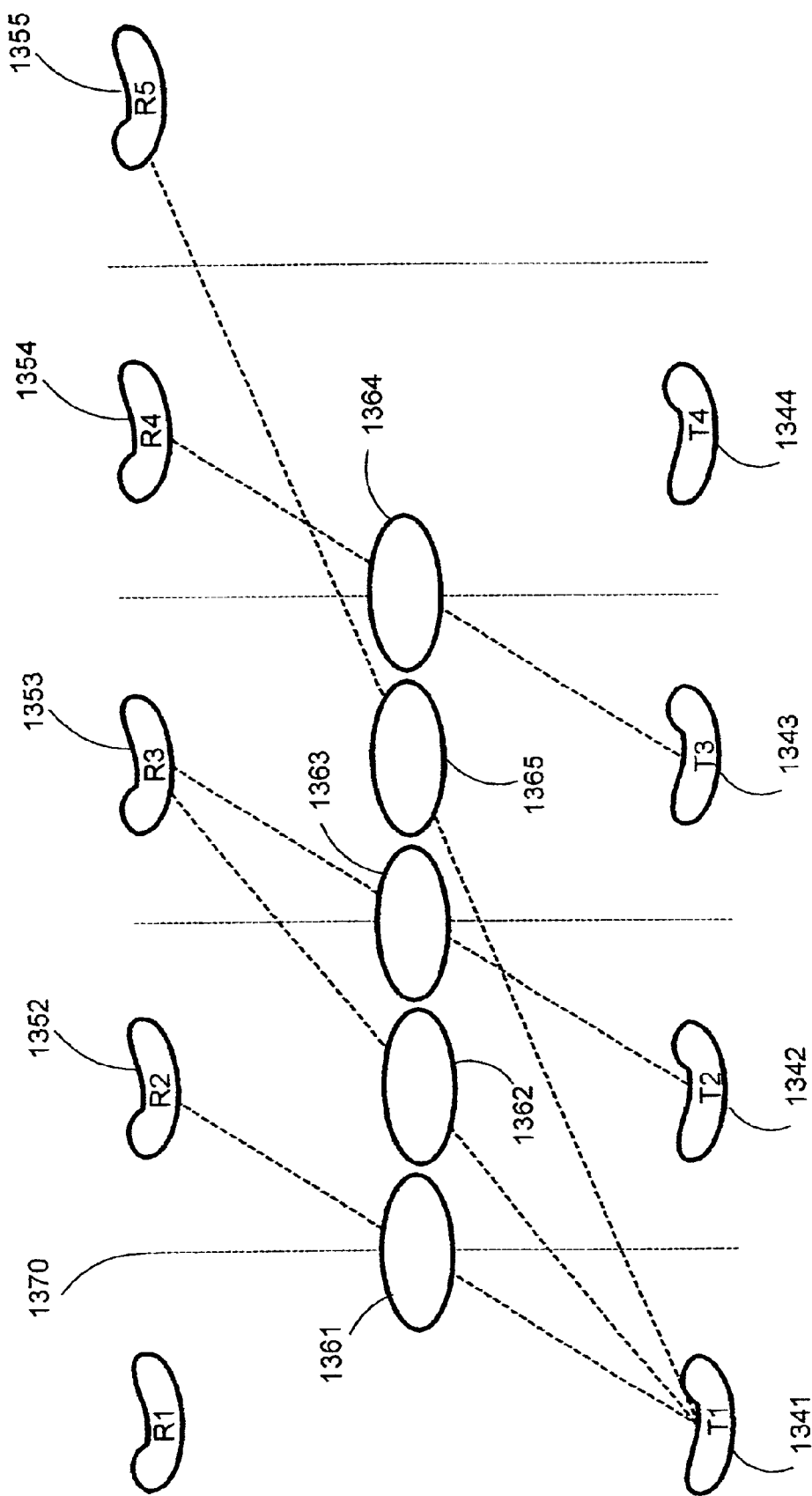
FIG. 13B shows the concept of apparent sampling points created by communicating non-vertically aligned element pairs.

The second technique is discussed with reference to FIG. 13B. An apparent sampling point is created when, for example, Transmitting Element 1 1341 communicates with Receiving Element 2 1352. A first apparent sample point 1361 occurs on a vertical plane 1370 halfway between the first and second element pairs. Likewise, a second apparent sampling point 1363 is created between Transmitting Element 2 1342 and Receiving Element 3 1353. It can be seen that creation of apparent sampling points by selection varying transmitting and receiving element pairs can not only increase the number of sampling points, but reduce spacing between sampling points. For example, the distance between antenna elements in this example is 2.25 inches. However, the distance between the first apparent sampling point 1360 and the real sampling point 1380 is less. Thus, cross-range ambiguities are mitigated by creation of apparent sampling points and reducing the effective spacing between both "real" sampling points, i.e. those between aligned pairs and apparent sampling points in accordance with Equation (1) above. Apparent sampling points may be created between any two communicating transmitting and receiving elements. For example, Transmitting Element 1 1341 in communication with Receiving Element 3 creates an apparent sampling point 1362 at the midpoint of a line between the two elements. Likewise, Transmitting Element 1 1341 communicating with Receiving Element 5 creates an apparent sampling point 1365. Thus, even if, for example, several element pairs are blocked by radio reflective material in the transmit medium, an apparent sampling point may be created with non-blocked elements. In that way, azimuth resolution may still be effected and the array can be "self-healing."

The firing sequence of the elements to create either real or apparent sampling points can be ordered or random. For example, real sampling points may be created in sequence from one end of the row to the other, i.e. where Transmitting Element 1 fires, receiving element 1 receives and so on, and then apparent sampling maybe used by firing Transmitting Element 1 to receiving element 2, Transmitting Element 2 to Receiving Element 3, and so on, until all elements have been used. Apparent samples may be interleaved with real samples, i.e. Transmitting Element 1 to Receiving Element 1 to create a real sampling point and Transmitting Element 2 to Receiving Element 1 to create an apparent sampling point. Obviously, any ordered or random combination of the above can be utilized.

Figure 14:
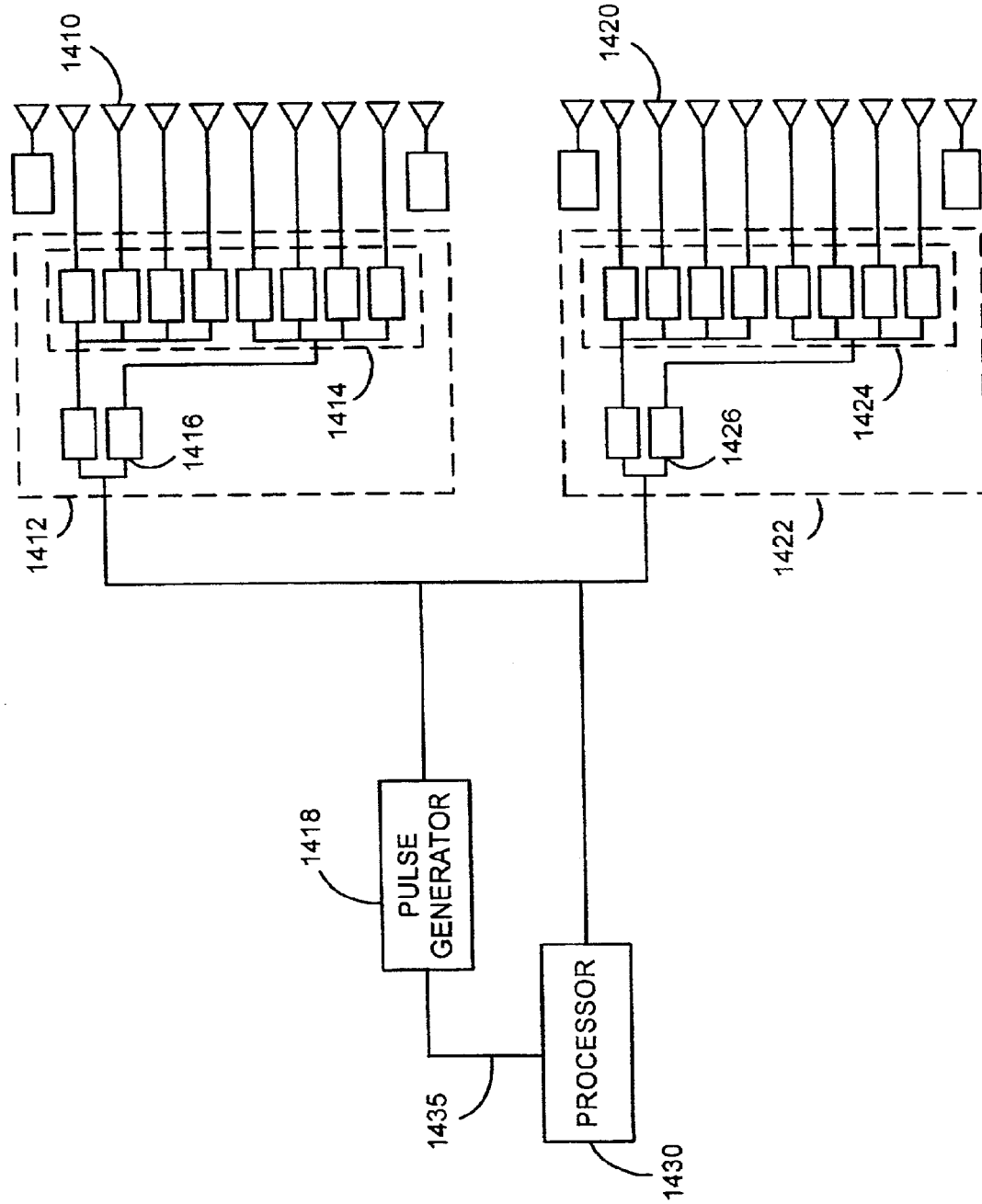
FIG. 14 is a functional diagram of an antenna array switching matrix.

A structure to effect the emission and reception sequence according to this method is shown in FIG. 14. An array of transmitting elements 1410 is coupled to a transmit row switching matrix 1412 comprised of a plurality of transmitting element switches 1414, one for each firing antenna element, which are connected by groups of four to two transmit side switches 1416. Likewise, an array of receiving elements 1420 are coupled to a receiving row switching matrix 1422 comprised of a plurality of receiving element switches 1424, that are connected by groups of four to two receive side switches 1426. Transmitting antenna element firing control signals 1435 are sent from a processor 1430 through the pulse generator 1418, which generates the signal to be emitted, to one of the two transmit side switches 1416 where it is sent to one of its four respective transmitting element switches 1414 in accordance with the control signals 1435.

Receiving antenna element operation is controlled by a processor 1430. The processor can be the same as the processor controlling the transmitting antenna firing or it can be separate. The processor can be implemented by a field programmable gated array (FPGA), a central processing unit (CPU) with a memory or other logic device.

It should be noted that high pass filters and low noise amplifiers might be desirous in receiving the transmitted signals by boosting the high frequency content. Additionally, high pass filtering can be used to shaped the transmitted waveform. Finally, it should also be noted that many of the The processor 1430 in effect comprises a computer system. Such a computer system includes, for example, one or more processors that are connected to a communication bus. The computer system can also include a main memory, preferably a random access memory (RAM), and can also include a secondary memory. The secondary memory can include, for example, a hard disk drive and/or a removable storage drive. The removable storage drive reads from and/or writes to a removable storage unit in a well-known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable a control processor to perform and/or cause the performance of features of the present invention. Accordingly, such computer programs represent controllers of the computer system of a transceiver.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of the invention are implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

As always, a variety of design tradeoffs are available to allow one skilled in the art to optimize performance to meet the requirements of a particular application. As described above and shown in the associated drawings, the present invention comprises an antenna array for use with ultra wideband radars and a method for its use. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. An impulse radar antenna array comprising:
   a. a ground plane, comprising a first surface and a second surface; and
   b. a plurality of antenna elements affixed to said first surface, each of said plurality of antenna elements being adapted to emit and receive ultra wideband signals; said plurality of antenna elements being disposed in parallel rows upon said first surface, said parallel rows comprising a transmitting row of transmitting elements adapted to emit ultra wideband signals and a receiving row of receiving elements adapted to receive ultra wideband signals impingent thereon; said receiving elements being equal in number to said transmitting elements and disposed in said receiving row such that each of said receiving elements is aligned with respect to a corresponding transmitting element disposed in said transmitting row; each of said receiving elements being oriented upon said first surface with respect to said corresponding transmitting element so as to create a symmetric product response with respect to aspect angle.

2. The impulse radar antenna array of claim 1, further comprising a radome, said radome comprising a surface having a departure; said departure describing a hollow such that when said radome overlays said transmitting row, radiated energy from said transmitting row is normal to said hollow.

3. The impulse radar antenna array of claim 2, wherein said radome is comprised of a low density, low dielectric, thermo/vacuum-formable material.

4. The impulse radar antenna array of claim 2, wherein said radome further comprises an acoustic damping means.

5. The impulse radar antenna array of claim 2, wherein said radome further comprises at least one stand-off.

6. The impulse radar antenna array of claim 5, wherein said stand-off is comprised of acoustic damping material.

7. The impulse radar antenna array of claim 2, wherein said radome further comprises at least one stand-off.

8. An impulse radar antenna array comprising:
   a. a ground plane, comprising a first surface and a second surface; and
   b. a plurality of antenna elements affixed to said first surface, each of said plurality of antenna elements being adapted to emit and receive ultra wideband signals; said plurality of antenna elements being disposed in parallel rows upon said first surface, said parallel rows comprising a transmitting row of transmitting elements adapted to emit ultra wideband signals and a receiving row of receiving elements adapted to receive ultra wideband signals impingent thereon; said transmitting row being disposed along a line parallel to a longitudinal axis of said first surface such that said each transmitting element comprising said transmitting row is alternatingly displaced laterally from said line.

9. The impulse radar antenna array of claim 8, wherein said receiving row is disposed along a line parallel to a longitudinal axis of said first surface such that said each receiving element comprising said receiving row is alternatingly displaced laterally from said line.

10. The impulse radar antenna array of claim 9, wherein said antenna elements are affixed to said first surface such that each of said elements in each of said rows is obliquely oriented with respect to a neighboring element within said row.

11. An impulse radar antenna array comprising:
    a. a ground plane, comprising a first surface and a second surface;
    b. a plurality of antenna elements affixed to said first surface, each of said plurality of antenna elements being adapted to emit and receive ultra wideband signals; said plurality of antenna elements being disposed in parallel rows upon said first surface, said parallel rows comprising a transmitting row of transmitting elements adapted to emit ultra wideband signals and a receiving row of receiving elements adapted to receive ultra wideband signals impingent thereon; each of said plurality of antenna elements including a tab; and
    c. a plurality of wave guides disposed upon and co-planar with said second surface coupled to each of said plurality of antenna elements through said ground plane via said tabs; said plurality of wave guides being comprised of transmission wave guides coupled to each of said transmitting elements, and receiving wave guides coupled to each of said receiving elements; each of said transmitting wave guides being of substantially unique length.

12. The impulse radar antenna array of claim 11, wherein any of said receiving wave guides coupled to any of said receiving elements is equal in length to the transmitting wave guide coupled to the corresponding transmitting element.

13. The impulse radar antenna array of claim 11, wherein each of said wave guides coupled to said receiving antenna elements is equal in length to a wave guide coupled to said transmitting antenna elements.

14. The impulse radar antenna array of claim 13, further comprising a fence structure between said transmitting row and said receiving row.

15. The impulse radar antenna array of claim 14, wherein said fence structure describes a curvi-linear surface.

16. The impulse radar antenna array of claim 14, wherein said ground plane comprises at least one means to reduce backlobe radiation.

17. The impulse radar antenna array of claim 16, wherein said means of reducing backlobe radiation is rolled edges of said ground plane.

18. The impulse radar antenna array of claim 17 wherein said radome further comprises a cylindrical departure, said cylindrical departure adapted to receive said transmitting row in a hollow formed by said first cylindrical departure such that signals radiating therefrom strike said departure at a normal angle.

19. The impulse radar antenna array of claim 18, wherein said transmitting antenna elements are oriented upon said ground plane with respect to said receiving antenna elements such as to create a symmetric product response in the azimuthal plane.

20. The impulse radar antenna array of claim 19, further comprising a dummy element affixed to said ground plane at each end said transmitting row and said receiving row.

21. The impulse radar antenna array of claim 20, wherein said transmitting antenna elements and said receiving antenna elements are affixed to said ground plane such as to effect a horizontally polarized response.

22. The impulse radar antenna array of claim 16, wherein said means of reducing backlobe radiation is non-linear edges of said ground plane.

23. The impulse radar antenna array of claim 16, wherein said means of reducing backlobe radiation is fence structures mounted to the edges of said ground plane.

24. The radar antenna array of claim 16 wherein said means of reducing backlobe radiation is a ground plane comprising serrations of the edges of said ground plane.

25. A method for using an antenna array, said antenna array being comprised of a row of transmitting antenna elements and a row of receiving antenna elements parallel to said row of transmitting antenna elements, said receiving antenna elements being arrayed such that any receiving antenna element comprising said row of receiving antenna elements is aligned with a corresponding transmitting antenna element in a plane perpendicular to said transmitting and receiving rows and a means for controlling signal emission from each transmitting antenna element and signal reception to each receiving antenna element, comprising the step of receiving via any of said receiving antenna elements a signal emitted from any non-corresponding transmitting antenna element.

26. The method according to claim 25, further comprising the step of receiving via a receiving antenna element a signal emitted from said corresponding transmitting antenna element.

27. A method for using an antenna array, said antenna array being comprised of a row of transmitting antenna elements and a row of receiving antenna elements parallel to said row of transmitting antenna elements, said receiving antenna elements being arrayed such that any receiving antenna element comprising said row of receiving antenna elements is aligned with a corresponding transmitting antenna element in a plane perpendicular to said transmitting and receiving rows and a means for controlling signal emission from each transmitting antenna element and signal reception to each receiving antenna element, comprising the steps of:

a. emitting a signal from at least one transmitting antenna element; and b. receiving said signal by at least one non-corresponding receiving antenna element.

28. The method according to claim 27, further comprising the steps of:

a. emitting a signal from at least one transmitting antenna element; and b. receiving said signal by a corresponding receiving antenna element.

29. A radar antenna array comprising:

a. a ground plane, said ground plane having an axis, a first surface and a second surface;

b. a transmitting row comprised of transmitting antenna elements affixed to said first surface parallel to said axis;

c. a receiving row comprised of receiving antenna elements affixed to said first surface parallel to said axis; said transmitting elements and said receiving elements being disposed within said transmitting row and said receiving row, respectively, such that inter-element spacing is substantially unique; and d. a plurality of co-planar wave guides affixed with said second surface, each of said plurality of wave guides being coupled to each transmitting antenna element and to each receiving antenna element through said ground plane and wherein each of said antenna elements includes a feed tab for coupling to said wave guides; said wave guides coupled to said transmitting antenna elements being of substantially unique lengths.

30. The radar antenna array of claim 29, wherein each of said wave guides coupled to said receiving antenna elements is equal in length to a wave guide coupled to said transmitting antenna elements.

31. The radar antenna array of claim 30, further comprising a fence structure between said transmitting row and said receiving row.

32. The radar antenna array of claim 31, wherein said fence structure describes a curvi-linear surface.

33. The radar antenna array of claim 30, wherein the radar antenna array further comprising a radome, said radome comprising a surface having a departure; said departure describing a hollow such that when said radome overlays said transmitting row, radiated energy from said transmitting row is substantially normal to said hollow; said radome further comprising at least one stand-off.

34. The radar antenna array of claim 30, wherein said ground plane comprises at least one means to reduce backlobe radiation.

35. The radar antenna array of claim 34, wherein said means of reducing backlobe radiation is rolled edges of said ground plane.

36. The radar antenna array of claim 34, wherein said radome further comprises a cylindrical departure, said cylindrical departure adapted to receive said transmitting row in a hollow formed by said first cylindrical departure such that signals radiating therefrom are incident said hollow at a normal angle.

37. The radar antenna array of claim 36, wherein said transmitting antenna elements are oriented upon said ground plane with respect to said receiving antenna elements such as to create a symmetric product response in the azimuthal plane.

38. The radar antenna array of claim 37, further comprising a dummy element affixed to said ground plane at each end said transmitting row and said receiving row.

39. The radar antenna array of claim 38, wherein said transmitting antenna elements and said receiving antenna elements are affixed to said ground plane such as to effect a horizontally polarized response.

40. The radar antenna array of claim 34, wherein said means of reducing backlobe radiation is non-linear edges of said ground plane.

41. The radar antenna array of claim 34, wherein said means of reducing backlobe radiation is fence structures mounted to the edges of said ground plan.

42. The radar antenna array of claim 34, wherein said means of reducing backlobe radiation is a ground plane comprising serrations of the edges of said ground plane.

* * * * *